(12) United States Patent
Yao

(10) Patent No.: US 10,368,210 B2
(45) Date of Patent: **\*Jul. 30, 2019**

(54) SERVICE PROCESSING METHOD, TERMINAL DEVICE, AND SERVICE ROAMING NETWORK

(71) Applicant: Huawei Technologies Co., Ltd., Shenzhen (CN)

(72) Inventor: Jun Yao, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/148,362

(22) Filed: Oct. 1, 2018

(65) Prior Publication Data
US 2019/0037368 A1    Jan. 31, 2019

Related U.S. Application Data

(63) Continuation of application No. 14/923,092, filed on Oct. 26, 2015, now Pat. No. 10,123,185, which is a
(Continued)

(30) Foreign Application Priority Data
Jun. 7, 2013    (CN) .......................... 2013 1 0226062

(51) Int. Cl.
*H04W 4/16* (2009.01)
*H04M 3/58* (2006.01)

(52) U.S. Cl.
CPC ............... *H04W 4/16* (2013.01); *H04M 3/58* (2013.01)

(58) Field of Classification Search
CPC .................................. H04M 3/58; H04W 4/16
See application file for complete search history.

(56) References Cited

U.S. PATENT DOCUMENTS 5,608,779 A * 3/1997 Lev ..................... H04W 88/181
                                                        455/436
6,650,629 B1 * 11/2003 Takahashi ............. H04W 84/20
                                                        370/335
(Continued)

FOREIGN PATENT DOCUMENTS

CN        1372425 A       10/2002
CN       102006671 A       4/2011
(Continued)

OTHER PUBLICATIONS

Machine Translation and Abstract of Chinese Publication No. CN103037319, Apr. 10, 2013, 21 pages.
(Continued)

*Primary Examiner* — Babar Sarwar
(74) *Attorney, Agent, or Firm* — Conley Rose, P.C.

(57) ABSTRACT

A service processing method includes determining, by a first local terminal, whether a service needs to be roamed, and when the service needs to be roamed, transferring, by the first local terminal, the service to a second local terminal, where the second local terminal is in communication with the first local terminal using a first network. Local terminals in the first network are interconnected, such that service roaming can be implemented. The first network is a locally interconnected network, roaming does not need to be controlled by an operator network, and the local terminal can control the roaming.

15 Claims, 17 Drawing Sheets

```
┌─────────────────────────────────────────────┐
│ A first local terminal determines whether   │
│ a service needs to be roamed                │──101
└─────────────────────────────────────────────┘
                       │
                       ▼
┌─────────────────────────────────────────────┐
│ In a case in which it is determined that    │
│ the service needs to be roamed, the first   │──102
│ local terminal transfers the service to a   │
│ second local terminal                       │
└─────────────────────────────────────────────┘
```

Related U.S. Application Data continuation of application No. PCT/CN2014/070398, filed on Jan. 9, 2014.

(56) References Cited

U.S. PATENT DOCUMENTS

| | | | | |
|---|---|---|---|---|
| 6,684,072 B1* | 1/2004 | Anvekar | ............... | H04W 4/24 379/114.05 |
| 7,242,905 B2* | 7/2007 | Kim | ............... | H04L 12/66 455/41.2 |
| 8,103,260 B2* | 1/2012 | Ahmed | ............... | H04M 1/725 379/202.01 |
| 8,189,543 B2* | 5/2012 | Bennett | ............... | H04N 7/163 370/328 |
| 8,316,400 B1* | 11/2012 | Kravets | ............... | H04L 63/0807 713/185 |
| 8,509,686 B2* | 8/2013 | Bennett | ............... | H04M 1/7253 455/41.2 |
| 9,674,760 B2* | 6/2017 | Kim | ............... | H04W 4/70 |
| 2002/0107023 A1* | 8/2002 | Chari | ............... | H04L 45/20 455/445 |
| 2002/0115471 A1 | 8/2002 | De Loye et al. | | |
| 2004/0156495 A1* | 8/2004 | Chava | ............... | H04L 45/00 379/392 |
| 2005/0227718 A1* | 10/2005 | Harris | ............... | H04W 72/044 455/509 |
| 2008/0112354 A1* | 5/2008 | Toutonghi | ............... | H04W 8/005 370/328 |
| 2008/0119137 A1* | 5/2008 | Lee | ............... | H04B 14/04 455/41.2 |
| 2010/0062763 A1* | 3/2010 | Sato | ............... | H04W 8/183 455/432.3 |
| 2010/0316036 A1* | 12/2010 | Jeyaseelan | ............... | H04W 36/30 370/338 |
| 2011/0111753 A1* | 5/2011 | Vainikka | ............... | H04W 36/32 455/425 |
| 2011/0250842 A1* | 10/2011 | Stafford | ............... | H04W 24/02 455/41.2 |
| 2012/0157054 A1* | 6/2012 | Hu | ............... | H04W 4/16 455/411 |
| 2013/0150051 A1* | 6/2013 | Van Phan | ............... | H04W 76/14 455/437 |
| 2013/0231088 A1* | 9/2013 | Jabara | ............... | G06Q 10/101 455/411 |
| 2013/0303162 A1* | 11/2013 | Iwamura | ............... | H04W 48/02 455/433 |
| 2014/0112169 A1* | 4/2014 | Zhou | ............... | H04W 72/10 370/252 |
| 2015/0139197 A1* | 5/2015 | He | ............... | H04W 4/70 370/336 |
| 2015/0146687 A1* | 5/2015 | Kim | ............... | H04W 76/14 370/331 |

FOREIGN PATENT DOCUMENTS

| | | |
|---|---|---|
| CN | 103037319 A | 4/2013 |
| CN | 103067625 A | 4/2013 |

OTHER PUBLICATIONS

Machine Translation and Abstract of Chinese Publication No. CN103067625, Apr. 24, 2013, 10 pages.

Foreign Communication From a Counterpart Application, PCT Application No. PCT/CN2014/070398, English Translation of International Search Report dated Mar. 13, 2014, 3 pages.

Foreign Communication From a Counterpart Application, PCT Application No. PCT/CN2014/070398, English Translation of Written Opinion dated Mar. 13, 2014, 18 pages.

\* cited by examiner

SERVICE PROCESSING METHOD, TERMINAL DEVICE, AND SERVICE ROAMING NETWORK

CROSS-REFERENCE TO RELATED APPLICATIONS

This application is a continuation of U.S. patent application Ser. No. 14/923,092, filed on Oct. 26, 2015, which is a continuation of International Application No. PCT/CN2014/070398, filed on Jan. 9, 2014, which claims priority to Chinese Patent Application No. 201310226062.X, filed on Jun. 7, 2013. All of the aforementioned patent applications are hereby incorporated by reference in their entireties.

TECHNICAL FIELD

The present disclosure relates to the field of communications technologies, and in particular, to a service processing method, a terminal device, and a service roaming network.

BACKGROUND

With the development of the communications network and the continuous progress of technologies such as computers and semiconductors, mobile terminals, such as smartphones and tablets, become popular rapidly, and become a primary means of communication between people. One user may have multiple intelligent terminals at the same time. Different mobile terminals have different functions, features, and application scenarios. A user may preferentially use different terminals in different application scenarios. For example, people generally use mobile phones on the road, and use portable computers or tablets at home.

With the continuous improvement of processing capabilities of mobile terminals, one terminal can process multiple tasks simultaneously. If a user has multiple mobile terminals at the same time, such as multiple mobile phones, or multiple switched network identifiers, such as multiple mobile numbers, the user generally expects to answer incoming calls of two mobile phones by using one mobile phone. A service provider provides a call roaming service in which a user can preset call roaming on a first terminal, and when another user of a remote terminal calls the first terminal, a switched network can make the call roam to a second terminal.

In the existing call roaming, the switched network implements roaming control over multiple mobile terminals. Therefore, support of the switched network is needed, and the multiple terminals that use the call roaming service should have both a capability of communicating with the switched network and a switched network identifier. Each roaming terminal needs to pay a roaming service fee to an operator to which the switched network belongs. Besides, in a place in which the switched network is not supported, the call roaming service cannot be used. Therefore, the existing call roaming service is inconvenient to use and has a high usage cost.

SUMMARY

In view of this, the present disclosure solves a problem of inconvenient service roaming between multiple local terminal devices, and provides a service roaming method, a terminal device, and a service roaming network.

To solve the problem, according to a first aspect, the present disclosure provides a service processing method, including determining, by a first local terminal, whether a service needs to be roamed; and transferring, by the first local terminal, the service to a second local terminal in a case in which the service needs to be roamed, where the second local terminal is in communication with the first local terminal by use of a first network.

With reference to the first aspect, in a possible implementation manner, before the transferring, by the first local terminal, the service to a second local terminal when the service needs to be roamed, the method includes sending, by the first local terminal, a roaming request to other local terminals including the second local terminal; and receiving a roaming response from the second local terminal, where the other local terminals are in communication with the first local terminal by use of the first network.

With reference to the first aspect, in a possible implementation manner, the step of sending, by the first local terminal, a roaming request to other local terminals includes broadcasting, by the first local terminal, the roaming request to the other local terminals; and after sending, by the first local terminal, a roaming request to other local terminals, the method further includes, in a case in which the first local terminal receives the roaming response, using a local terminal that returns the roaming response as the second local terminal.

With reference to the first aspect, in a possible implementation manner, after the using a local terminal that returns the roaming response as the second local terminal, the method includes sending, by the first local terminal, a message of canceling the roaming request to a local terminal, except the second local terminal, in the other local terminals.

With reference to the first aspect, in a possible implementation manner, the step of sending, by the first local terminal, a roaming request to other local terminals includes sending, by the first local terminal, the roaming request to each local terminal of the other local terminals at a preset time interval in sequence; and after the sending, by the first local terminal, a roaming request to other local terminals, the method further includes, in a case in which the first local terminal receives the roaming response, using a local terminal that returns the roaming response as the second local terminal.

With reference to the first aspect, in a possible implementation manner, after sending, by the first local terminal, a roaming request to other local terminals, the method further includes starting timing by the first local terminal when sending the roaming request, where if no roaming response is received within a set period of time, the first local terminal initiates a roaming request again or ends the roaming.

With reference to the first aspect, in a possible implementation manner, before transferring, by the first local terminal, the service to a second local terminal, the method further includes determining whether a trust relationship is established with the second local terminal; and when the trust relationship is already established with the second local terminal, transferring, by the first local terminal, the service to the second local terminal.

With reference to the first aspect, in a possible implementation manner, in a case in which the service is a service received by the first local terminal from the remote terminal by use of a second network, the step of determining, by a first local terminal, whether a service needs to be roamed includes any one or more of the following operations: determining, by the first local terminal, whether the first local terminal receives a roaming instruction from a user, where if the roaming instruction from the user is received, the service needs to be roamed; determining, by the first local terminal, whether a device status of the first local terminal meets a preset roaming condition, where if the preset roaming condition is met, the service needs to be roamed; determining, by the first local terminal, whether the first local terminal is being used by the user, where if the first local terminal is not used by the user, the service needs to be roamed; and determining, by the first local terminal, whether another local terminal that can process the service exists in the first network, where if another local terminal that can process the service exists, the service needs to be roamed.

With reference to the first aspect, in a possible implementation manner, the device status of the first local terminal includes any one or more of the following states: the first local terminal is processing a service of the same type; the first local terminal is processing a service of another type; and the first local terminal is in a sleep state.

With reference to the first aspect, in a possible implementation manner, in the case in which the service is the service received by the first local terminal from the remote terminal by use of the second network, the step of the transferring, by the first local terminal, the service to a second local terminal includes forwarding, by the first local terminal, data and/or an instruction, related to the service, from the remote terminal to the second local terminal by use of the first network; and forwarding, by the first local terminal, a processing result of the service from the second local terminal to the remote terminal by use of the second network.

With reference to the first aspect, in a possible implementation manner, in a case in which the service is a service initiated by the first local terminal, the step of determining, by a first local terminal, whether a service needs to be roamed includes any one or more of the following operations: determining, by the first local terminal, whether the first local terminal can process the service, where if the first local terminal cannot process the service, the service needs to be roamed; and determining, by the first local terminal, whether another local terminal that can process the service exists in the first network, where if another local terminal that can process the service exists, the service needs to be roamed.

With reference to the first aspect, in a possible implementation manner, in the case in which the service is the service initiated by the first local terminal, the step of transferring, by the first local terminal, the service to a second local terminal includes sending, by the first local terminal, a service request for the service to the second local terminal by use of the first network; and sending, by the second local terminal, the service request to a remote terminal by use of a second network, receiving a processing result of the service from the remote terminal by use of the second network, and sending the processing result of the service to the first local terminal by use of the first network.

In a second aspect, the present disclosure provides a terminal device, including a processing unit configured to determine whether a service needs to be roamed; and a transferring unit configured to, in a case in which the service needs to be roamed, transfer, by the first local terminal, the service to a second local terminal, where the second local terminal is in communication with the terminal device by use of a first network.

With reference to the second aspect, in a first possible implementation manner, the terminal device further includes a sending unit configured to send a roaming request to other local terminals including the second local terminal in the processing unit; and a receiving unit configured to receive a roaming response from the second local terminal, where the other local terminals are in communication with the terminal device by use of the first network.

With reference to the second aspect, in a possible implementation manner, the processing unit is further configured to instruct the sending unit to broadcast the roaming request to the other local terminals; and in a case in which the receiving unit receives the roaming response, use a local terminal that returns the roaming response as the second local terminal.

With reference to the second aspect, in a possible implementation manner, the processing unit is further configured to, after using the local terminal that returns the roaming response as the second local terminal, instruct the sending unit to send a message of canceling the roaming request to a local terminal, except the second local terminal, in the other local terminals.

With reference to the second aspect, in a possible implementation manner, the processing unit is further configured to instruct the sending unit to send the roaming request to each local terminal of the other local terminals at a preset time interval in sequence, and in a case in which the receiving unit receives the roaming response, use a local terminal that returns the roaming response as the second local terminal.

With reference to the second aspect, in a possible implementation manner, the processing unit is further configured to, after the roaming request is sent to the other local terminals, start timing when the sending unit sends the roaming request; and if no roaming response is received within a set period of time, instruct the sending unit to initiate a roaming request again or end the roaming.

With reference to the second aspect, in a possible implementation manner, the processing unit is further configured to determine whether a trust relationship is established with the second local terminal; and the transferring unit is further configured to transfer the service to the second local terminal when the processing unit determines that the trust relationship is already established with the second local terminal.

With reference to the second aspect, in a possible implementation manner, in a case in which the service is a service received by the receiving unit from the remote terminal by use of a second network, the processing unit is configured to execute any one or more of the following functions: determining whether the terminal device receives a roaming instruction from a user, where if the roaming instruction from the user is received, the service needs to be roamed; determining whether a device status of the terminal device meets a preset roaming condition, where if the preset roaming condition is met, the service needs to be roamed; determining whether the terminal device is being used by the user, where if the terminal device is not used by the user, the service needs to be roamed; and determining whether another local terminal that can process the service exists in the first network, where if another local terminal that can process the service exists, the service needs to be roamed.

With reference to the second aspect, in a possible implementation manner, the device status of the terminal device includes any one or more of the following states: the terminal device is processing a service of the same type; the terminal device is processing a service of another type; and the terminal device is in a sleep state.

With reference to the second aspect, in a possible implementation manner, the processing unit is further configured to, in the case in which the service is the service received by the receiving unit from the remote terminal by use of the second network, instruct the sending unit to forward data and/or an instruction, related to the service, from the remote terminal to the second local terminal by use of the first network, and instruct the sending unit to forward a processing result of the service from the second local terminal to the remote terminal by use of the second network.

With reference to the second aspect, in a possible implementation manner, in the case in which the service is the service initiated by the sending unit, the processing unit is configured to execute any one or more of the following functions: determining whether the terminal device can process the service, where if the terminal device cannot process the service, the service needs to be roamed; and determining whether another local terminal that can process the service exists in the first network, where if another local terminal that can process the service exists, the service needs to be roamed.

With reference to the second aspect, in a possible implementation manner, the processing unit is further configured to, in the case in which the service is the service initiated by the terminal device, instruct the sending unit to send a service request for the service to the second local terminal by use of the first network, such that the second local terminal sends the service request to a remote terminal by use of a second network, receives a processing result of the service from the remote terminal by use of the second network, and sends the processing result of the service to the first local terminal by use of the first network.

According to a third aspect, the present disclosure provides a service roaming network, including a first network, where the terminal device according to any one structure of embodiments of the present disclosure is used as at least one local terminal in the first network.

With reference to the third aspect, in a possible implementation manner, the service roaming network further includes a second network, where at least one local terminal in the first network is in communication with the second network.

In the embodiments of the present disclosure, the local terminals in the first network are interconnected, such that service roaming can be implemented. The first network is a locally interconnected network, roaming does not need to be controlled by an operator network, and the local terminal can control the roaming. Therefore, the service roaming is convenient, no roaming fees need to be paid, and usage costs are low.

BRIEF DESCRIPTION OF DRAWINGS

Accompanying drawings that are included in and form a part of the specification together with the specification show exemplary embodiments, features, and aspects of the present disclosure, and are used to explain a principle of the present disclosure.

DESCRIPTION OF EMBODIMENTS

The following describes various exemplary embodiments, features, and aspects of the present disclosure in detail with reference to accompanying drawings. A same reference sign in the accompanying drawings indicates components with a same or similar function. Although various aspects of an embodiment are shown in the accompanying drawings, unless otherwise specified, the accompanying drawings do not need to be drawn to scale.

The word "exemplary" for exclusive use herein means "used as an example or embodiment or for descriptive purpose". Any embodiment described herein for "exemplary" purpose does not need to be explained as being superior to or better than another embodiment.

In addition, to better describe the present disclosure, many details are provided in the following implementation manners. Those skilled in the art should understand that, without these details, the present disclosure still can be implemented. In the other embodiments, well-known methods, means, components, and circuits are not described in detail, so that a main purpose of the present disclosure is highlighted.

Embodiment 1

Figure 1:
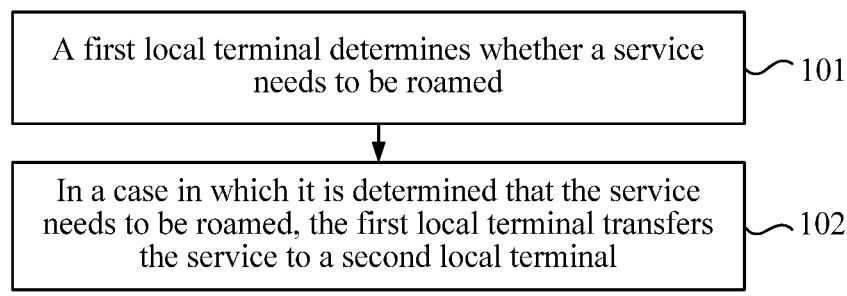
FIG. 1 is a flowchart of a service processing method according to Embodiment 1 of the present disclosure.

FIG. 1 is a flowchart of a service processing method according to Embodiment 1 of the present disclosure. As shown in FIG. 1, the service processing method includes the following steps.

Step 101: A first local terminal determines whether a service needs to be roamed.

The first local terminal may be a service initiator or may be a service receiver. In different cases, methods used by the first local terminal to determine whether the service needs to be roamed may be different. Specific description is as follows.

Case 1: The first local terminal is a service initiator.

In a case in which the service is a service received by the first local terminal from the remote terminal by use of a second network, any one or more of the following operations may be included in scenarios in which the first local terminal determines whether the service needs to be roamed. Scenario 1: the first local terminal determines whether the first local terminal receives a roaming instruction from a user, where if the roaming instruction from the user is received, the service needs to be roamed; scenario 2: the first local terminal determines whether a device status of the first local terminal meets a preset roaming condition, where the preset roaming condition is met, the service needs to be roamed; scenario 3: the first local terminal determines whether the first local terminal is being used by the user, where if the first local terminal is not used by the user, the service needs to be roamed; and scenario 4: the first local terminal determines whether another local terminal that can process the service exists in the first network, where if another local terminal that can process the service exists, the service needs to be roamed.

The device status of the first local terminal includes any one or more of the following states: the first local terminal is processing a service of the same type; the first local terminal is processing a service of another type; the first local terminal is in a sleep state, and the like. The sleep state is a generic term for a state in which a terminal is not operated for a long time, which may be a standby of a screen, entering of a power saving mode, or the like. When a roaming request or service request is received, the terminal device can be woken and execute a subsequent step.

Case 2: The first local terminal is a service receiver.

In a case in which the service is a service initiated by the first local terminal, any one or more of the following operations may be included in scenarios in which the first local terminal determines whether the service needs to be roamed. Scenario 1: the first local terminal determines whether the first local terminal can process the service, where if the first local terminal cannot process the service, the service needs to be roamed; and scenario 2: the first local terminal determines whether another local terminal that can process the service exists in the first network, where if another local terminal that can process the service exists, the service needs to be roamed.

Step 102: In a case in which the service needs to be roamed, the first local terminal transfers the service to a second local terminal, where the second local terminal is in communication with the first local terminal by use of a first network.

Further, in a case in which the service needs to be roamed in step 101, the first local terminal may also interact with other local terminals to determine whether there is another local terminal that can roam the service. Therefore, before step 102, a process of roaming requesting may further be included: the first local terminal sends a roaming request to other local terminals including the second local terminal, and receives a roaming response from the second local terminal, where the other local terminals are in communication with the first local terminal by use of the first network.

In addition, the first local terminal and/or the second local terminal can be in communication with the remote terminal by use of the second network, and the roaming request includes at least a type of the service, an identifier of the remote terminal, and an identifier of the first local terminal. The first network in the embodiment of the present disclosure may include a local connection network connected by one or more of a wireless local area network (WLAN), the Ethernet, a Bluetooth technology, Near Field Communication (NFC), and human body communication, where the WLAN may include a near field network that uses technologies such as WiFi. The first network may mainly be formed by interconnected local terminals, where the local terminals may be, for example, smartphones, telephones, and tablets (such as an iPAD). The second network may include one or more of remote connection networks such as a Public Switched Telephone Network (PSTN), a mobile network, and a wide area network, where the mobile network may be, for example, a Code Division Multiple Access (CDMA) network, a Global System for Mobile Communications (GSM) network, or a Wideband Code Division Multiple Access (WCDMA) network. At least one local terminal (the first local terminal or the second local terminal) in the first network may establish a connection with a service provider by use of the second network.

A method used by the first local terminal to send the roaming request to the other local terminals including the second local terminal may include two manners.

Manner 1: The roaming request is sent in a broadcast manner.

The first local terminal broadcasts the roaming request to the other local terminals. In this case, after the first local terminal sends the roaming request to the other local terminals, the method further includes, in a case in which the first local terminal receives the roaming response, using a local terminal that returns the roaming response as the second local terminal.

After the first local terminal sends the roaming request to the other local terminals in the first network in the broadcast manner, if one second local terminal returns a response, other local terminals do not need to respond. Therefore, after the local terminal that returns the roaming response is used as the second local terminal, a step of canceling other roaming requests may further be included: sending, by the first local terminal, a message of canceling the roaming request to a local terminal, except the second local terminal, in the other local terminals.

In addition, if no local terminals return a roaming response for a long time, it may also be considered by default that no local terminals provide a roaming capability and accept the roaming. Therefore, after the first local terminal sends the roaming request to the other local terminals, the method may further include starting timing by the first local terminal when sending the roaming request, where if no roaming response is received within a set period of time, the first local terminal initiates a roaming request again or ends the roaming. After the preset period of time expires, if the first local terminal does not receive the roaming response, it may be considered by default that this roaming fails, and the first local terminal may initiate a roaming request again or end the roaming.

Manner 2: The roaming request is sent in a polling manner.

The first local terminal sends the roaming request to each local terminal of the other local terminals at a preset time interval in sequence. In this case, after the first local terminal sends the roaming request to the other local terminals, the method may further include, in a case in which the first local terminal receives the roaming response, using a local terminal that returns the roaming response as the second local terminal.

Further, the step in which the first local terminal transfers the service to the second local terminal may be executed differently in different cases in which the first local terminal is a service initiator (corresponding to the foregoing case 1) or a service receiver (corresponding to the foregoing case 2).

Case 1: In the case in which the service is the service received by the first local terminal from the remote terminal by use of the second network, the step in which the first local terminal transfers the service to the second local terminal includes forwarding, by the first local terminal, data and/or an instruction, related to the service, from the remote terminal to the second local terminal by use of the first network; and forwarding, by the first local terminal, a processing result of the service from the second local terminal to the remote terminal by use of the second network.

Case 2: In the case in which the service is the service initiated by the first local terminal, the step in which the first local terminal transfers the service to the second local terminal includes sending, by the first local terminal, a service request for the service to the second local terminal by use of the first network; and sending, by the second local terminal, the service request to the remote terminal by use of the second network, receiving a processing result of the service from the remote terminal by use of the second network, and sending the processing result of the service to the first local terminal by use of the first network.

A service type in the embodiment of the present disclosure may be a service that keeps a continuous connection from start to end of the service, for example, a voice call service or a video call service; or may be a service that does not need to keep a continuous connection from start to end of the service, for example, a Short Message Service (SMS) or a voice message service; or may be a service of another type, which is not limited in the embodiment of the present disclosure.

The roaming response in the embodiment of the present disclosure may include a type of the service, an identifier of the first local terminal, an identifier of the second local terminal, an identifier of the remote terminal, information that the second local terminal accepts or refuses the roaming request, and the like. The identifier of each terminal may be identity information such as a phone number, a name of a registered user or a user identifier of the terminal in a switched network, or may be other identity information preset by a user in a local area network, to identify an identity of a sender of a roaming request or a roaming response.

Further, to better ensure user privacy and security of information exchange during the roaming of the user, before the first local terminal transfers the service to the second local terminal, a trust relationship between the first local terminal and the other local terminals can be established in the first network. The service can be transferred to the second local terminal only after the trust relationship is established. The following steps may be included: determining whether a trust relationship is established with the second local terminal; and when the trust relationship is already established with the second local terminal, transferring, by the first local terminal, the service to the second local terminal.

Multiple methods can be selected to establish a trust relationship. For example, a pairing key may be preset; the first local terminal sends a pairing request that carries the pairing key to the other local terminals; the first local terminal and each of the other local terminals perform identity authentication in the first network using the pairing key; and after the identity authentication succeeds, the first local terminal and the other local terminals are pairing terminals for each other. By means of pairing, a trust relationship can be established among all local terminals in the first network.

In this embodiment, the local terminals in the first network are interconnected, such that service roaming can be implemented. The first network is a locally interconnected network, roaming does not need to be controlled by an operator network, and the local terminal can control the roaming. Therefore, the service roaming is convenient, no roaming fees need to be paid, and usage costs are low.

Embodiment 2

Figure 2A:
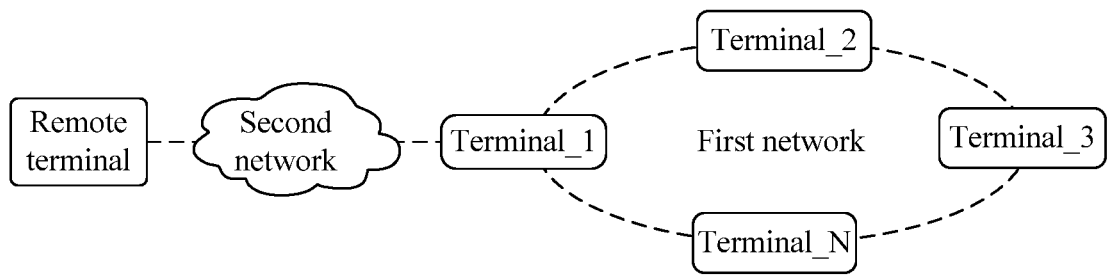
FIG. 2A is a schematic diagram of a networking structure of an application example of a service roaming method according to an embodiment of the present disclosure.
Figure 2B:
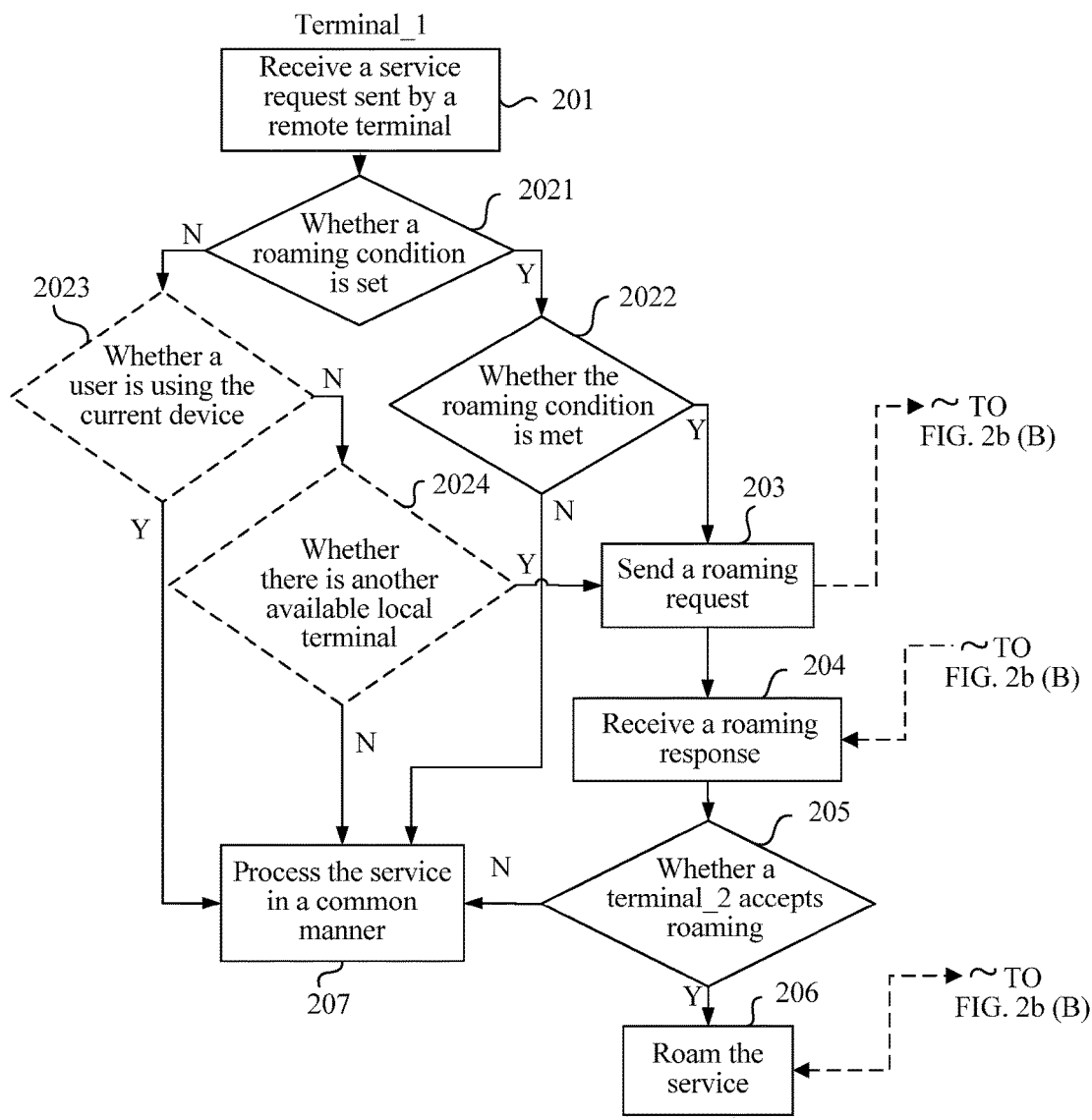
FIG. 2B(A) and FIG. 2B(B) are a flowchart of a service roaming method according to Embodiment 2 of the present disclosure.
Figure 2B:
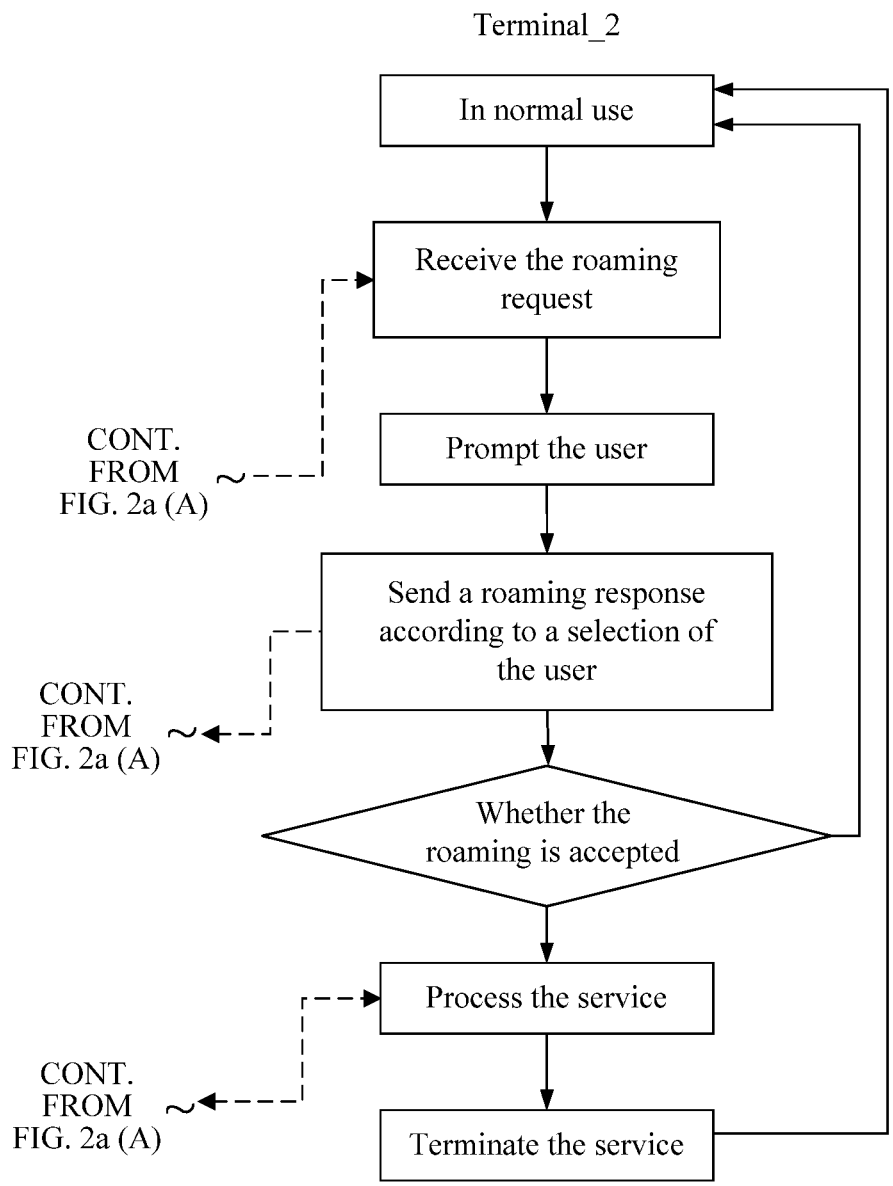

FIG. 2A is a schematic diagram of a networking structure of an application example of a service roaming method according to an embodiment of the present disclosure. For all embodiments below, reference may be made to the networking structure in FIG. 2A. FIG. 2B(A) and FIG. 2B(B) are a flowchart of a service roaming method according to Embodiment 2 of the present disclosure. As shown in FIG. 2A, FIG. 2B(A), and FIG. 2B(B), for the case 1 in the foregoing embodiment, an example that a first network includes at least two local terminals, a first local terminal is a terminal_1, and another local terminal is a terminal_2 is used. A service in this embodiment is a service received by the terminal_1 from a remote terminal by use of a PSTN, for example, the terminal_1 being a called party in a call or a recipient of information, and a roaming condition is preset. The service roaming method may include the following steps.

Step 201: The terminal_1 receives a service request from the remote terminal, where the service request may be from the remote terminal to the terminal_1 by use of a second network, such as the PSTN, the service request may include a service type, such as an information or call service, and the service request may further include identity information such as an identifier (ID) of the remote terminal and/or an ID of the terminal_1.

After receiving the service request, the terminal_1 may first determine whether the current device is in a sleep state. If the current device is not in the sleep state, subsequent steps are normally executed; if the current device is in the sleep state, subsequent steps are executed after the current device is woken. The subsequent steps may be directly executed without determining whether the current device is in the sleep state.

Step 202: The terminal_1 determines whether roaming is needed.

The following steps may be included.

Step 2021: The terminal_1 determines whether a roaming condition is preset (refer to scenario 2 of case 1 in the foregoing embodiment). If the roaming condition is preset on the terminal_1, step 2022 is executed; if the roaming condition is not preset, step 2023 may be executed. In addition, if the roaming condition is not preset, the terminal_1 may also directly execute step 207 to process the service in a common manner or select another manner to perform processing.

Step 2022: The terminal_1 determines whether a device status of the terminal_1 meets the preset roaming condition. If yes, step 203 may be executed; otherwise, the terminal_1 may execute step 207 to process the service in a common manner or select another manner to perform processing, or may execute step 2023.

That the device status of the terminal_1 meets the preset roaming condition may include but be not limited to, the terminal_1 is processing a service of the same type; the terminal_1 is processing a service of another type; and the terminal_1 is in the sleep state. The roaming condition may also include a destination device identifier of the roaming. If the roaming condition is met, the roaming is needed. The roaming condition may also be set to unconditional roaming, that is, provided that the terminal_1 receives the service request, the roaming is needed.

Step 2023: Determine whether a user is using the current device (refer to scenario 3 of case 1 in the foregoing embodiment). If yes, the terminal_1 processes the service in the common manner; otherwise, step 2024 is executed.

Step 2024: The terminal_1 searches for other local terminals that a user in the first network is using, to determine whether there is another available local terminal. For example, if the terminal_2 is being used by the user, and establishes a trust relationship, for example, successful pairing, with the terminal_1, the terminal_2 is the second local terminal, and the terminal_1 can execute step 203. If no, the terminal_1 may execute step 207 to process the service in the common manner. There may be multiple methods for establishing a trust relationship between all terminals in the first network, which is not specifically limited in the embodiment of the present disclosure. If a method for sending a pairing request is used, a key carried in the pairing request may be preset.

In addition, an execution sequence of step 2021 and step 2023 may change, that is, step 2023 may be executed before step 2021 is executed. When step 2021 is executed first, step 2023 and step 2024 are optional steps; when step 2023 is executed first, step 2021 and step 2022 are optional steps.

Step 203: The terminal_1 sends a roaming request to the terminal_2.

The roaming request may carry information such as the ID of the terminal_1 and the ID of the remote terminal, and the identifier of the terminal_1 may be helpful for a terminal that receives the roaming request to determine an identity of the terminal_1, and determine whether the roaming can be accepted. In addition, if an identifier of a destination device, for example, an ID of the terminal_2, is known, the ID of the terminal_2 may be carried in the roaming request.

After the terminal_2 that is in normal use receives the roaming request, the terminal_2 prompts the user that there is a service roaming request, which may be voice-broadcasting prompt information, or may be screen-displaying prompt information. The prompt information may include the identifier of the remote terminal, for example, a phone number, a name of a registered user, or another user identifier, or may include the identifier of the terminal_1, for example, a name of a registered user or another user identifier. The prompt information may further indicate clearly that the service is a service roamed from the terminal_1. The terminal_2 sends a roaming response to the terminal_1 according to a selection of the user, where the roaming response may carry result information about whether the terminal_2 receives the roaming. The terminal_2 performs subsequent operations according to the selection of the user. If the roaming is accepted, the terminal_2 processes a subsequently received service that is transferred by the terminal_1, and returns to a normal usage state of the terminal_2 until the service ends; otherwise, the terminal_2 returns to the normal usage state of the terminal_2.

Step 204: The terminal_1 receives a roaming response that is from the terminal_2.

Step 205: The terminal_1 determines, according to result information in the roaming response, whether the terminal_2 accepts the roaming. If yes, step 206 is executed; otherwise, the roaming procedure ends, and step 207 is executed.

A period of waiting time can be set in this embodiment. The terminal_1 starts timing when sending the roaming request. After the set period of waiting time expires, if the terminal_1 does not receive a roaming response of the terminal_2, it may also be considered by default that the terminal_2 refuses the roaming.

Step 206: The terminal_1 transfers the service to the terminal_2 for processing, which is that the terminal_1 receives data and/or an instruction sent from the remote terminal, bridges the data and/or the instruction to the terminal_2 for processing, forwards the data and/or the instruction returned from the terminal_2 to the remote terminal, and ends the procedure after the service processing ends.

Step 207: The terminal_1 terminates the roaming procedure and processes the service in the common manner, or feeds back refusing information to the remote terminal, terminates the service, and ends the procedure.

In this embodiment, the local terminals in the first network are interconnected, such that service roaming can be implemented when the service request is received. If the second network is included, the service roaming can be implemented simply by connecting one local terminal to the remote terminal by use of the second network. Because the first network is a locally interconnected network, roaming does not need to be controlled by an operator network, and the local terminal can control the roaming. Therefore, the service roaming is convenient, no roaming fees need to be paid, and usage costs are low.

Embodiment 3

Figure 3A:
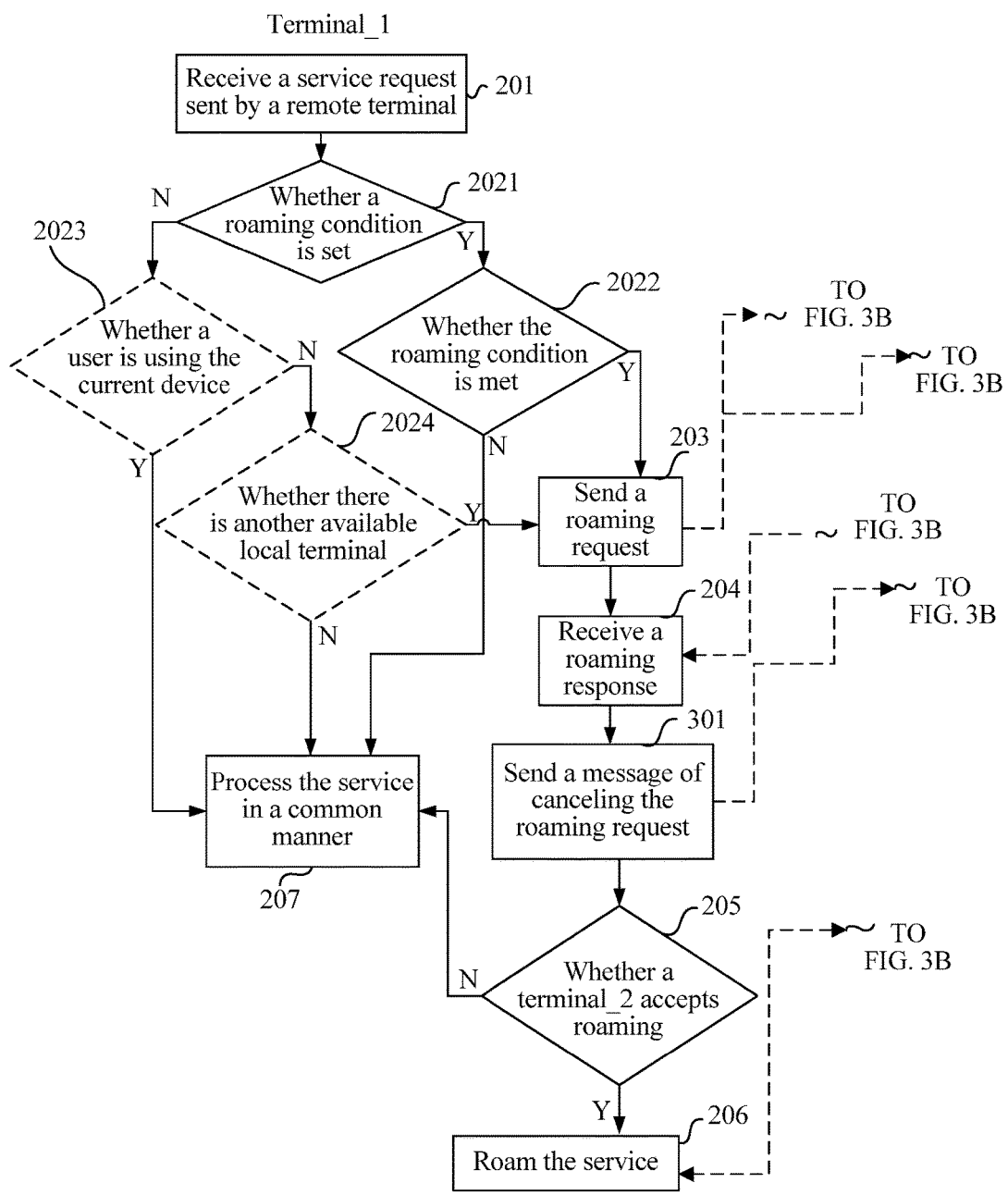
FIG. 3A and FIG. 3B are a flowchart of a service roaming method according to Embodiment 3 of the present disclosure.
Figure 3B:
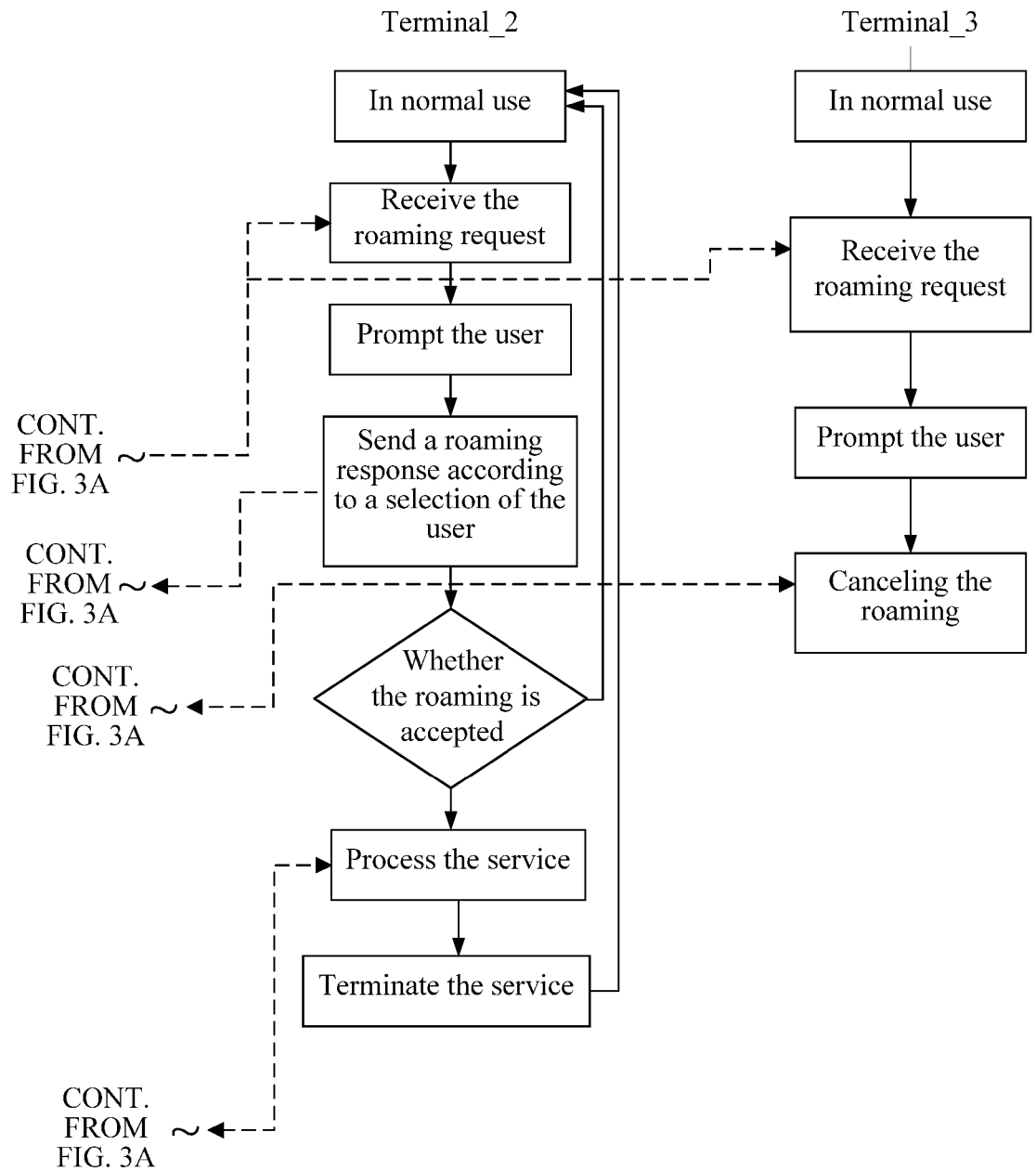

FIG. 3A and FIG. 3B are a flowchart of a service roaming method according to Embodiment 3 of the present disclosure. Components with a same sign in FIG. 3A, and FIG. 3B, and FIG. 2A, FIG. 2B(A), and FIG. 2B(B) have a same meaning. As shown in FIG. 3A and FIG. 3B, an example that a first network includes at least three local terminals, a first local terminal is a terminal_1, and other local terminals are a terminal_2 and a terminal_3 is used. Main differences between this embodiment and Embodiment 2 are as follows.

In step 203, a manner for sending the roaming request by the terminal_1 may be broadcasting, wherein the terminal_1 sends the roaming request to the multiple other local terminals, for example, the terminal_2 and the terminal_3, in the first network at the same time. The manner for sending the roaming request may also be polling, wherein the terminal_1 sends the roaming request to the other local terminals in sequence. In step 204, after the terminal_1 receives the roaming response from the terminal_2, if it is determined according to the roaming response that the terminal_2 provides a capability of processing the service and accepts the roaming request, the terminal_2 is the second local terminal, and the service roaming method may further include the following steps.

Step 301: The terminal_1 sends information about canceling the roaming request to all the other terminals except the terminal_2 in a broadcast or polling manner. Step 301 and step 205 can be executed at the same time or in a specific sequence. The embodiment of the present disclosure does not limit a time-sequence relationship between the both steps.

In addition, a period of waiting time may also be set in this embodiment. If the terminal_1 does not receive the roaming response within the period of waiting time, it is considered by default that all the other local terminals refuse the service request. It is also possible that the roaming response fed back by the terminal_2 is refusing the roaming, and the terminal_1 proceeds to wait for a feedback of other local terminals except the terminal_2, until one of the other local terminals accepts the request, or the set period of waiting time expires.

In this embodiment, the local terminals in the first network are interconnected, such that service roaming can be implemented when the service request is received. If the second network is included, the service roaming can be implemented simply by connecting one local terminal to the remote terminal by use of the second network. Because the first network is a locally interconnected network, roaming does not need to be controlled by an operator network, and the local terminal can control the roaming. Therefore, the service roaming is convenient, no roaming fees need to be paid, and usage costs are low.

Embodiment 4

Figure 4A:
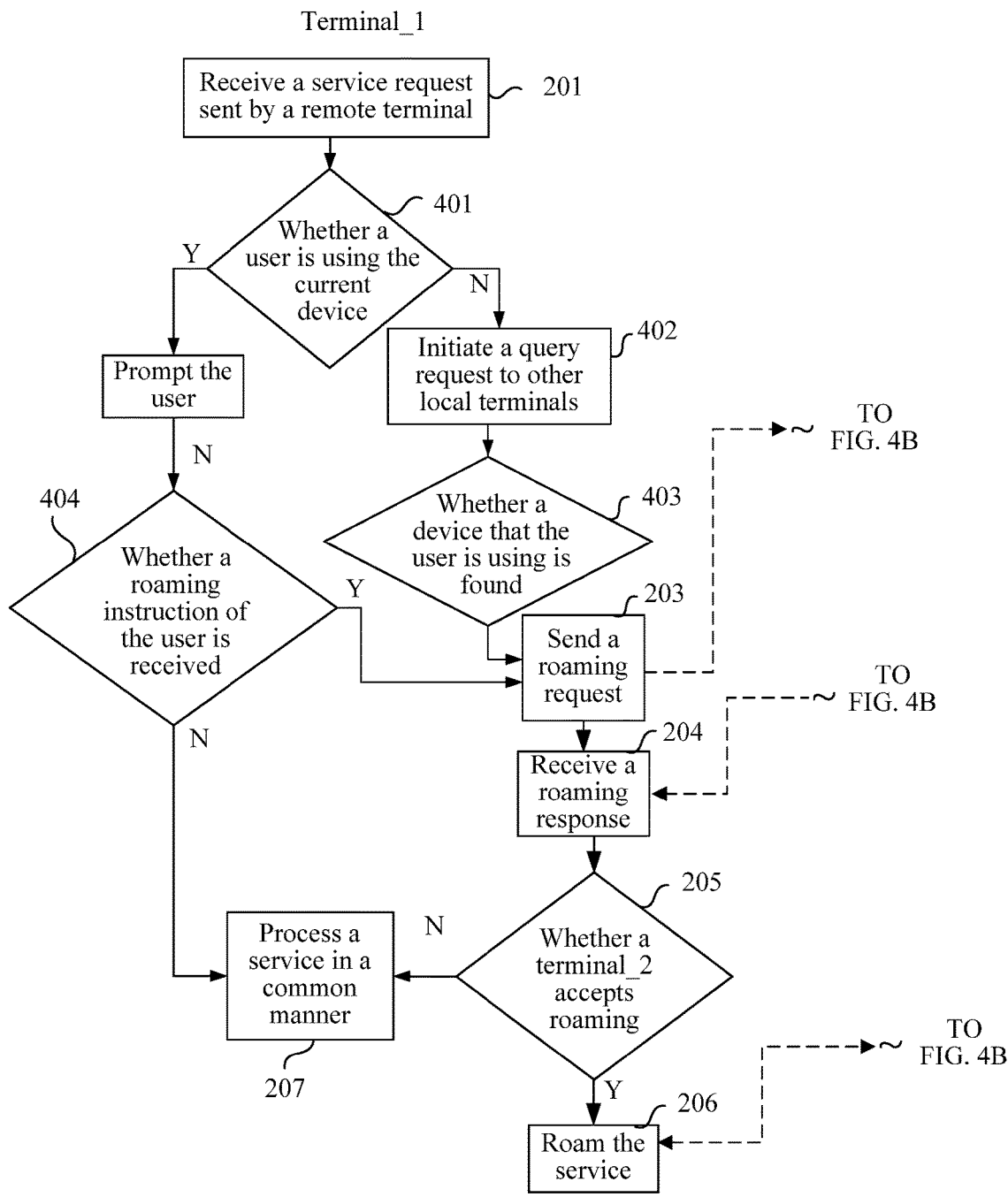
FIG. 4A and FIG. 4B are a flowchart of a service roaming method according to Embodiment 4 of the present disclosure.
Figure 4B:
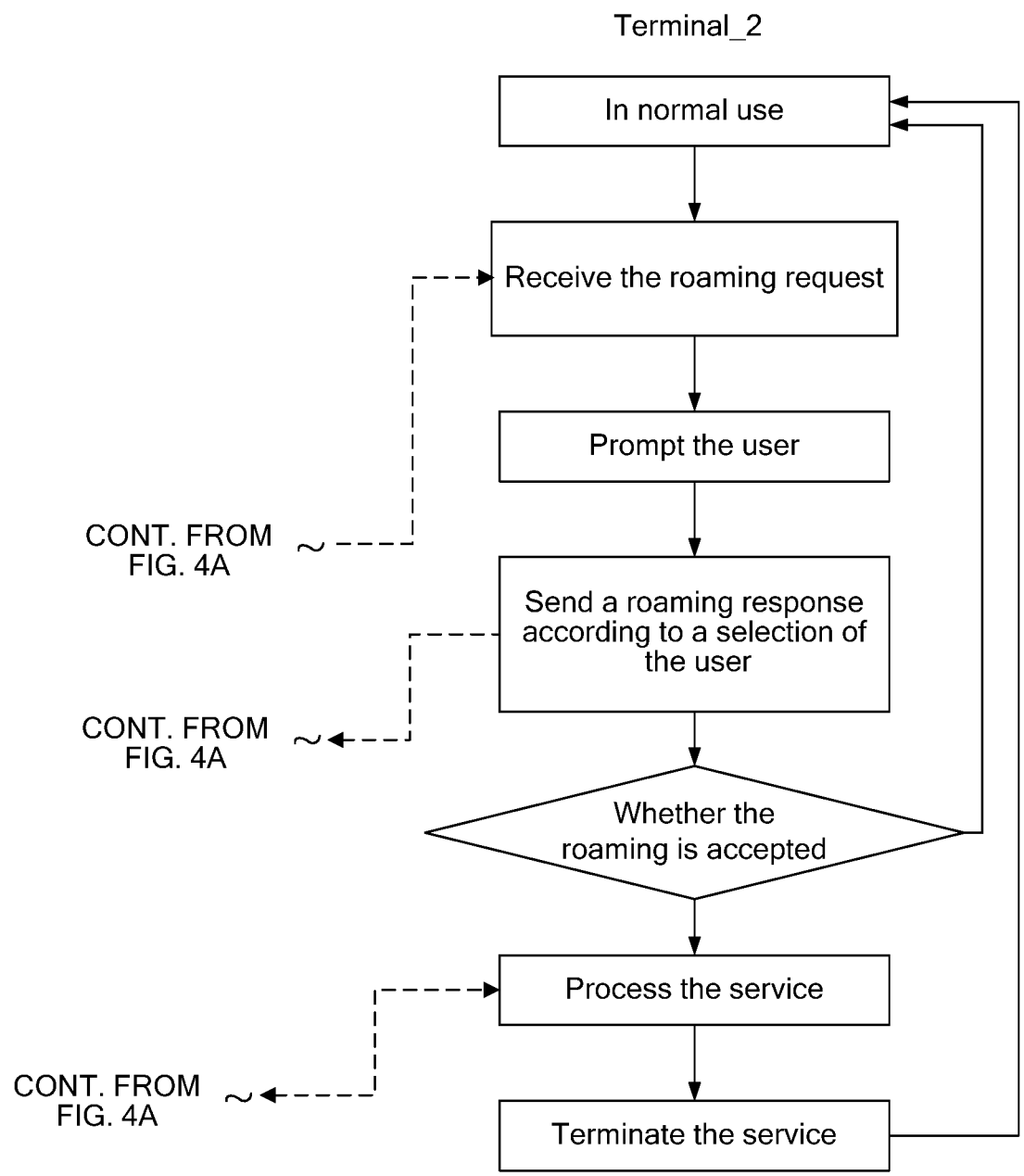

FIG. 4A and FIG. 4B are a flowchart of a service roaming method according to Embodiment 4 of the present disclosure. Components with a same sign in FIG. 4A and FIG. 4B and FIG. 2A, FIG. 2B(A), FIG. 2B(B), FIG. 3A, and FIG. 3B have a same meaning. As shown in FIG. 4A and FIG. 4B, a main difference between this embodiment and Embodiment 2 is that whether roaming is needed is determined according to whether a terminal_1 is being used by a user (refer to scenario 3 of case 1 in the foregoing embodiment).

Before step 203 in which the terminal_1 determines whether the roaming is needed, step 401 may be executed, wherein the terminal_1 determines whether the user is using the current device; and if yes, the user is prompted directly on the terminal_1 that there is a service request; otherwise, step 402 is executed.

Step 402: The terminal_1 initiates a query request to other local terminals to query a device that the user is using.

Step 403: The terminal_1 determines whether the device that the user is using is found; and if yes, the terminal_1 directly determines in step 202 that the roaming is needed, and executes step 203.

Methods for determining whether the terminal_1 is being used by the user may be whether the terminal_1 is operated by the user, whether the terminal_1 is in a sleep state, or the like.

After the step in which the terminal_1 prompts the user that there is a service request, step 404 may also be executed first, and then whether to execute step 203 is determined.

Step 404: The terminal_1 determines whether a roaming instruction from the user is received; and if yes, step 203 is executed; otherwise, step 207 is executed and the terminal_1 processes the service in a common manner. In this scenario, the roaming is performed according to an active selection of the user. For example, the user selects a roaming button on the terminal_1 to execute the roaming.

For example, if a service that the user is processing on a current terminal is inconvenient to interrupt, the user may further select to roam the service to another terminal. In a process of service roaming, the user may proceed to process the current service on the current terminal. In a common case, a new incoming call rings when the user is answering a call from a client on the terminal_1, the user is inconvenient to answer, and may actively select to roam the incoming call to the terminal_2 of a family member for answering.

In this embodiment, the local terminals in the first network are interconnected, such that the service roaming can be implemented when the service request is received. If the second network is included, the service roaming can be implemented simply by connecting one local terminal to the remote terminal by use of the second network. Because the first network is a locally interconnected network, roaming does not need to be controlled by an operator network, and the local terminal can control the roaming. Therefore, the service roaming is convenient, no roaming fees need to be paid, and usage costs are low.

Embodiment 5

Figure 5:
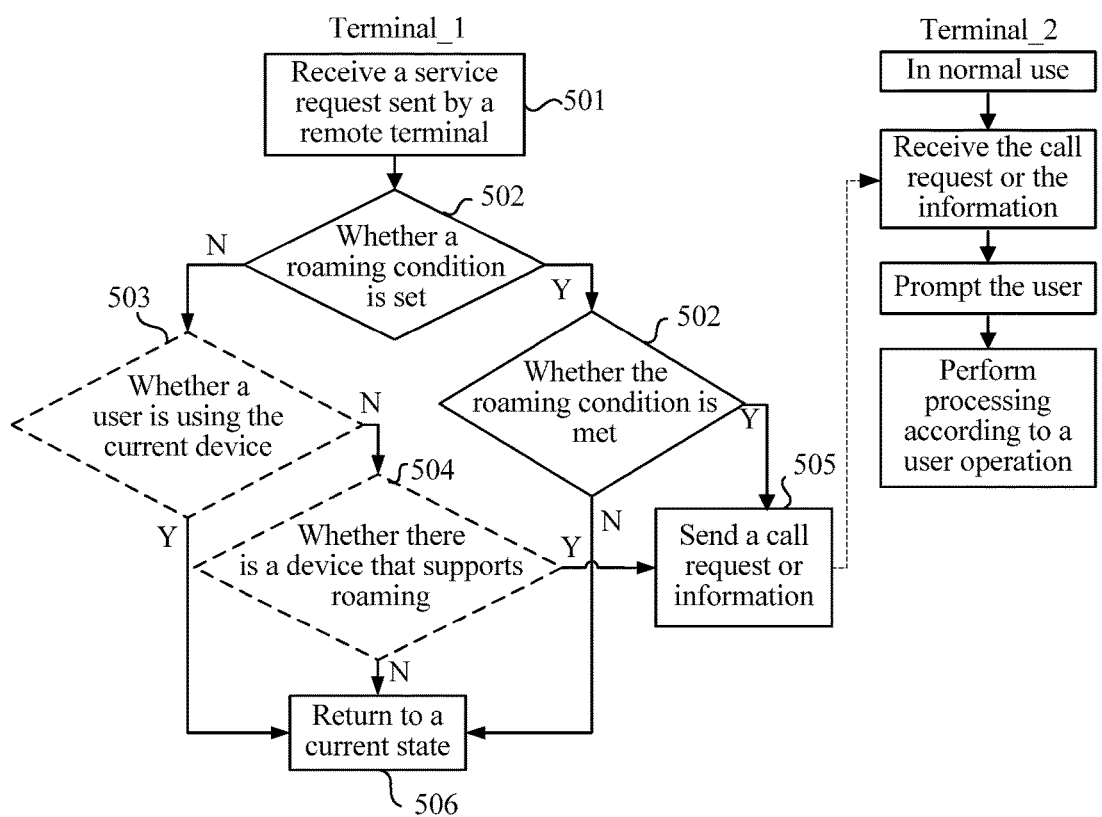
FIG. 5 is a flowchart of a service roaming method according to Embodiment 5 of the present disclosure.

FIG. 5 is a flowchart of a service roaming method according to Embodiment 5 of the present disclosure. As shown in FIG. 5, for the case 1 in the foregoing embodiment, an example that a first local terminal is a terminal_1, and a second local terminal is a terminal_2 is used, and a service in this embodiment is a service received by the terminal_1, for example, the terminal_1 being a called party in a call service such as a voice call or video call, or a recipient of an information service such as a SMS, Multimedia Messaging Service (MMS), or voice information. A main difference between the call service and the information service is that, in the call service, a continuous service connection needs to be established and maintained between a local terminal and a remote terminal, while in the information service, a continuous service connection is not required. The service roaming method may include the following steps.

Step 501: The terminal_1 receives a service request, for example, a call request or information, from the remote terminal. The terminal_1 first prompts a user on the local terminal according to a common procedure that a call or information arrives.

Step 502: If the user sets a roaming condition and the roaming condition is met, the terminal_1 executes step 505 or directly executes step 504. If the roaming condition is not met or the roaming condition is not set, step 503 may be executed, or step 506 is directly executed to return to a current state and the service is processed in a common manner. For the roaming condition in this embodiment, reference may be made to the related description of the roaming condition in the forgoing embodiments.

Step 503: If the user does not set the roaming condition, the terminal_1 may further determine whether to forward the call request or the information by determining whether the user is using the current device. If the user is using the current device, the terminal_1 does not forward the call request or the information, and executes step 506. If the user is not using the current device, step 504 is executed.

Step 504: The terminal_1 determines whether there is a device that supports roaming. For example, if there is a roaming terminal_2 that can process the call or the information service and agrees to receive the roaming, step 505 is executed; otherwise, step 506 is executed. For a detailed method used by the terminal_1 to determine whether there is a device that supports roaming, reference may be made to the related description in the foregoing embodiments.

Step 505: The terminal_1 sends the service request that carries the call request or the information to the terminal_2.

Step 506: The terminal_1 returns to a current state and processes the service in the common manner, for example, prompts the user about the call or the information, and waits for the processing of the user.

The terminal_2 may prompt the user, according to the received service request, that there is information or a call, and perform processing, for example, displaying the information or answering the call, according to an operation of the user.

In this embodiment, the local terminals in the first network are interconnected, such that service roaming can be implemented when the service request is received. If the second network is included, the service roaming can be implemented simply by connecting one local terminal to the remote terminal by use of the second network. Because the first network is a locally interconnected network, roaming does not need to be controlled by an operator network, and the local terminal can control the roaming. Therefore, the service roaming is convenient, no roaming fees need to be paid, and usage costs are low.

Embodiment 6

Figure 6:
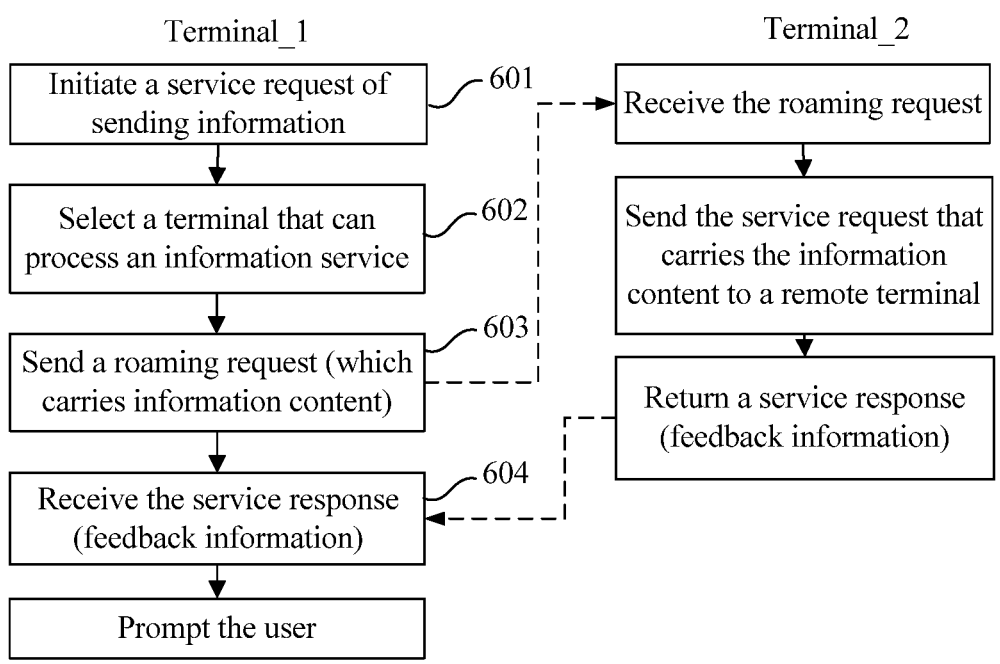
FIG. 6 is a flowchart of a service roaming method according to Embodiment 6 of the present disclosure.

FIG. 6 is a flowchart of a service roaming method according to Embodiment 6 of the present disclosure. As shown in FIG. 6, for case 2 in the foregoing embodiment, an example that a first local terminal is a terminal_1, and a second local terminal is a terminal_2 is used, and a service in this embodiment is a service initiated by the terminal_1, for example, the terminal_1 being a sender of an information service. The service roaming method may include the following steps.

Step 601: After a user edits information on the terminal_1 and selects a recipient, the terminal_1 initiates a service request for sending the information, where the service request carries information content, an ID of the terminal_1, an ID of a remote terminal, and the like.

Step 602: The terminal_1 selects, in the first network, a terminal that can process the message service, for example, the terminal_2 that provides a capability of processing the information service.

Step 603: After selecting the corresponding terminal_2, the terminal_1 sends a roaming request to the terminal_2, where the roaming request carries the information content, an ID of a remote terminal of the information recipient, and/or an ID of the terminal_1 that initiates the roaming request.

After receiving the roaming request, the terminal_2 sends, by use of a second network and according to the information content and the ID of the remote terminal in the roaming request, a service request that carries the information content to the remote terminal corresponding to the ID of the remote terminal. An optional subsequent operation for the terminal_2 includes returning a service response to the terminal_1 according to a sending status. Feedback information in the service response may be a processing status of this terminal, or may be an information processing status, for example, "sent", "arrived", or "read", of a network or the remote terminal.

Step 604: After receiving a service response, the terminal_1 may prompt the user according to the feedback information.

In this embodiment, the local terminals in the first network are interconnected, such that service roaming can be implemented when the service request is initiated. If the second network is included, the service roaming can be implemented simply by connecting one local terminal to the remote terminal by use of the second network. Because the first network is a locally interconnected network, roaming does not need to be controlled by an operator network, and the local terminal can control the roaming. Therefore, the service roaming is convenient, no roaming fees need to be paid, and usage costs are low.

Embodiment 7

Figure 7:
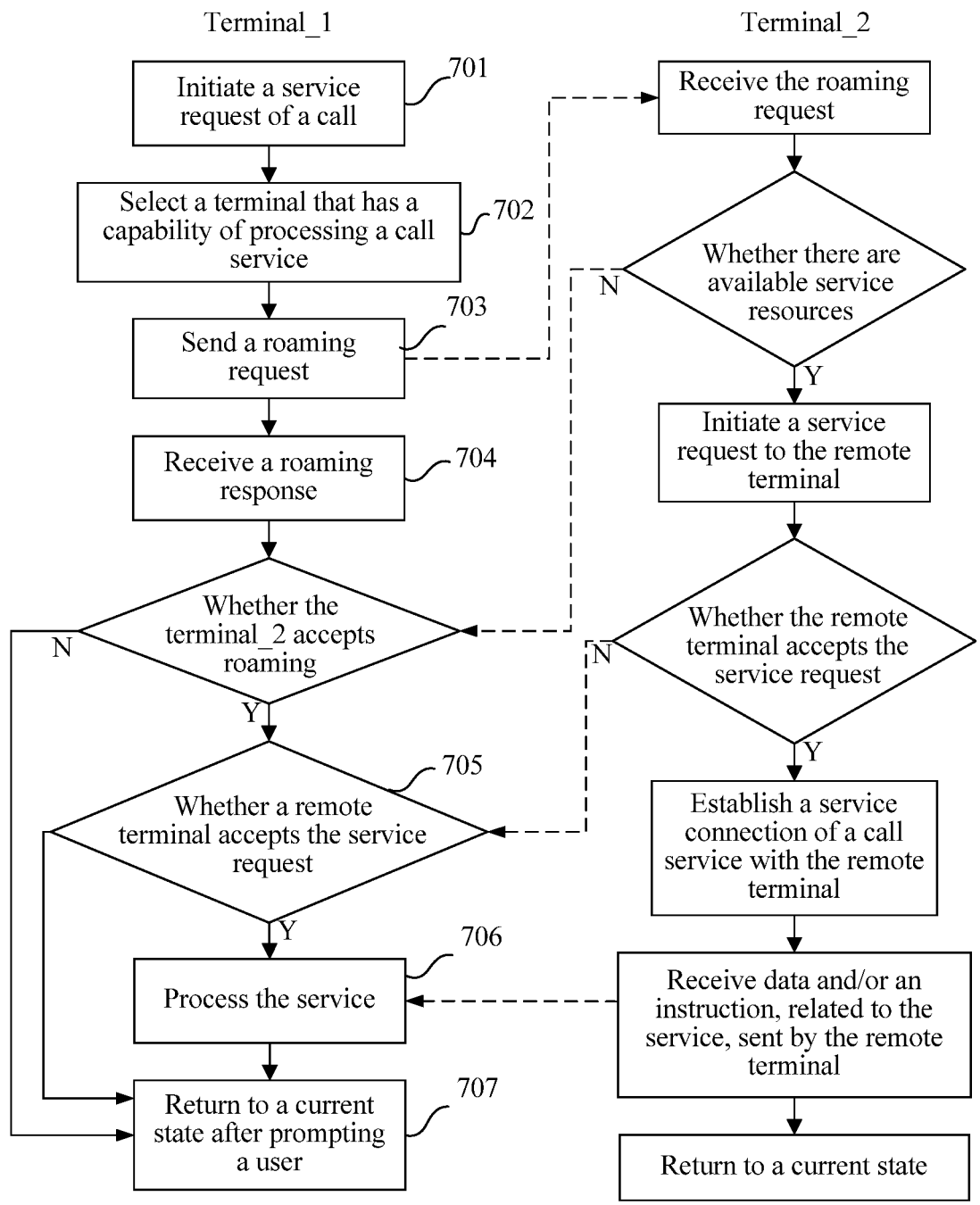
FIG. 7 is a flowchart of a service roaming method according to Embodiment 7 of the present disclosure.

FIG. 7 is a flowchart of a service roaming method according to Embodiment 7 of the present disclosure. As shown in FIG. 7, for case 2 in the foregoing embodiment, an example that a first local terminal is a terminal_1, and a second local terminal is a terminal_2 is used, and a service in this embodiment is a service initiated by the terminal_1, for example, the terminal_1 being a calling party in a call service. The service roaming method may include the following steps.

Step 701: When a user uses the terminal_1, the terminal_1 initiates a service request of a call according to an operation of the user. A service type carried in the service request may be a voice call, a video call, and the like. The service request may further carry an ID of the terminal_1, an ID of a remote terminal, and the like.

Step 702: If the terminal_1 does not provide a network capability of processing the service, a terminal that supports the corresponding network capability may be searched for and selected among other local terminals in a first network. In this embodiment, an example that the terminal_2 provides the network capability needed for processing the call service is used for description.

Step 703: The terminal_1 sends a roaming request to the corresponding terminal_2, where the roaming request may include any one or more of a service type, an ID of the remote terminal, an ID of the terminal_1, and an ID of a registered user of the terminal_1, where the ID of the terminal_1 may be helpful for the terminal_2 to determine an identity of the terminal_1, so as to determine whether to provide a roaming service. The ID of the terminal in this embodiment may be identifier information such as a number of the terminal or a name set by the user, which is not specifically limited.

Step 704: After receiving a roaming response from the terminal_2, if it is determined according to accepting information in the roaming response that the terminal_2 accepts the roaming, the terminal_1 executes step 705. If it is determined according to refusing information that the terminal_2 refuses the roaming, the terminal_1 executes step 707 in which the terminal_1 returns to a current state after prompting the user.

After receiving the roaming request, if there are available service resources, the terminal_2 returns the roaming response that carries the accepting information to the terminal_1, and initiates a service request to the remote terminal corresponding to the ID of the remote terminal. If there are no available service resources, the terminal_2 returns the roaming response that carries the refusing information to the terminal_1. After initiating the service request to the remote terminal corresponding to the ID of the remote terminal, if a service response from the remote terminal is received, the terminal_2 determines, according to the service response, whether the remote terminal accepts the service request. If the remote terminal accepts the service request, the terminal_2 establishes a service connection of the call service with the remote terminal by use of a second network. In this case, the remote terminal may display the ID of the terminal_1 or the ID of the terminal_2. Then the terminal_2 forwards, to the terminal_1, data or an instruction or both that are related to the service and from the remote terminal. If the remote terminal refuses the service request, the terminal_2 returns a service response that carries refusing information to the terminal_1, informs the terminal_1 that the remote terminal refuses the service request, then returns to the current state and resumes the normal work.

Step 705: The terminal_1 determines whether a remote terminal accepts the service request. The terminal_1 receives a service response of the remote terminal from the terminal_2. If the service response carries accepting information, it may be determined according to the accepting information that the remote terminal accepts the service, and step 706 is executed. If the service response carries refusing information, it may be determined according to the refusing information that the remote terminal refuses the service, and step 707 is executed in which the terminal_1 returns to the current state after prompting the user.

Step 706: The terminal_1 performs corresponding service processing on received data or a received instruction or received both that are related to the service and from the terminal_2. For the call service, the terminal_1 proceeds to process the call until the call ends.

Step 707: The terminal_1 returns to the current state after prompting the user, and processes the service according to a common procedure.

In addition, in the embodiments of the present disclosure, the first network in which the local terminals are interconnected may be different from a network in which the terminal is in communication with a service provider. Therefore, the local terminal that participates in service roaming does not need to provide the same network capability. For example, if a terminal that supports a mobile network (for example, GSM, CDMA, WCDMA, or Long Term Evolution (LTE)) and WiFi interconnects with another terminal that supports only WiFi, the terminal that supports a mobile network and WiFi may roam the service to the other terminal by use of WiFi, or the other terminal that supports only WiFi may initiate a mobile network service (for example, a voice call and an information service) by use of the terminal that supports a mobile network and WiFi.

Therefore, in each embodiment of the present disclosure, each terminal need not provide an identifier of the service network. For example, when multiple terminals that support both WiFi and a mobile network are in communication with form the first network, provided that one terminal has a mobile network identifier (number), other terminals may also use a mobile network service. Due to a bandwidth limitation of the mobile network, a quantity of terminals that use the mobile network service at the same time may be limited.

In addition, different from the Cordless Telephony System, in each embodiment of the present disclosure, terminals that support the service roaming are mutually independent devices, without a need of a subordination relationship.

In this embodiment, the local terminals in the first network are interconnected, such that the service roaming can be implemented when the service request is initiated. If the second network is included, the service roaming can be implemented simply by connecting one local terminal to the remote terminal by use of the second network. Because the first network is a locally interconnected network, roaming does not need to be controlled by an operator network, and the local terminal can control the roaming. Therefore, the service roaming is convenient, no roaming fees need to be paid, and usage costs are low.

Embodiment 8

Figure 8A:
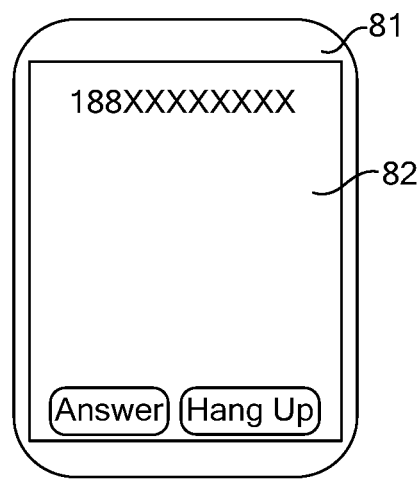
FIGS. 8A-8I are schematic comparison diagrams between an existing interface and an operation interface at which a user selects roaming in a service roaming method according to Embodiment 8 of the present disclosure.
Figure 8B:
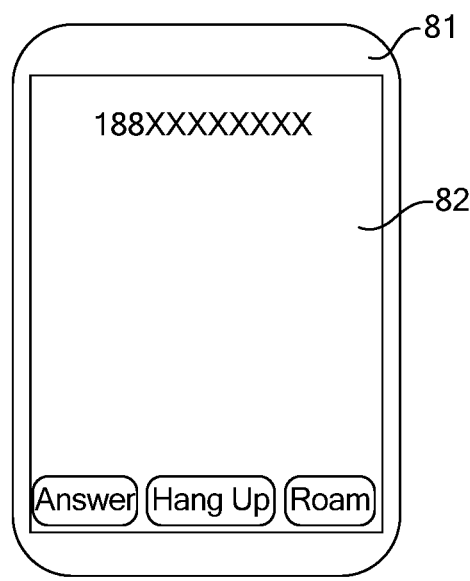

In each of the foregoing embodiments of the present disclosure, no matter whether to actively initiate a service or passively accept a service, and whether a user sets a roaming condition or not, a first local terminal in a first network can perform roaming according to a selection operation of the user. Provided that the user selects the roaming, a roaming instruction is sent to determine that the roaming is needed. This can be implemented by setting a roaming selection button at an operation interface of the first local terminal, for example, a mobile device. FIG. 8A to FIG. 8I are schematic comparison diagrams between an existing interface and an operation interface at which an user selects roaming in a service roaming method according to Embodiment 8 of the present disclosure. A telephone call is used as an example. As shown in FIG. 8A, when an incoming call request is received, a mobile device 81 that does not use the service roaming method of the present disclosure displays at an interface 82 a phone number or a name (if the number is already in an address book) of a calling party, and displays two buttons, <Answer> and <Hang Up>, in the lower part of the interface. The user may answer or refuse the call. When a mobile device 81 that uses the service roaming method of the present disclosure receives an incoming call request, an interface 82 displays not only a phone number (for example, 188XXXXXXXX) or a name (if the number is already in an address book) of an calling party, but also a <Roam> button in addition to two buttons <Answer> and <Hang Up>, in the lower part of the interface 82, as shown in FIG. 8B. If the user taps <Roam>, a list of terminals that supports roaming may be displayed at the interface 82, and the user may select a destination terminal of the roaming from the list.

Figure 8C:
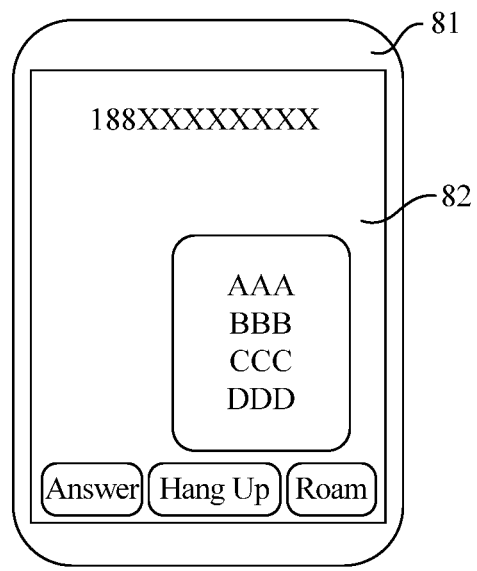
Figure 8D:
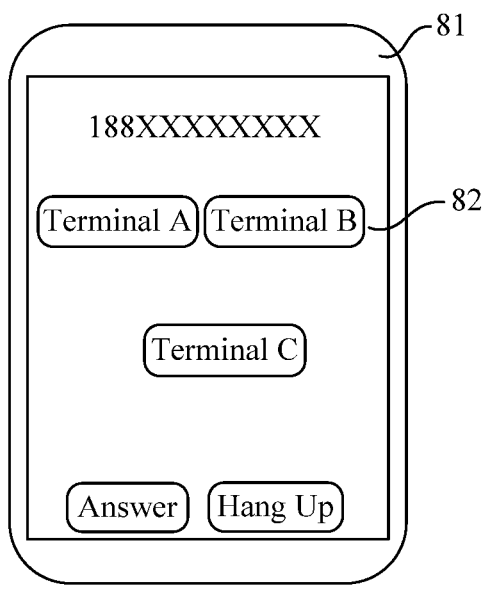

In addition, the user may specify in advance a terminal that needs to be roamed, in another manner, for example, a network-attached setting. In this case, the call request is directly roamed, and the interface 82 shown in FIG. 8C is displayed, where AAA, BBB, CCC, and DDD are names of terminals that support roaming. Further, as shown in FIG. 8D, in addition to the requesting number, the interface 82 may display terminals that can roam the service, for example, a terminal A, a terminal B, and a terminal C. The user directly taps a terminal, which means that the service request is transferred to the terminal. The <Hang Up> button may also be a <Refuse> button. An arranging sequence of the three buttons may also be different from that shown in the diagram. The embodiment of the present disclosure does not limit names and positions of the buttons.

Figure 8E:
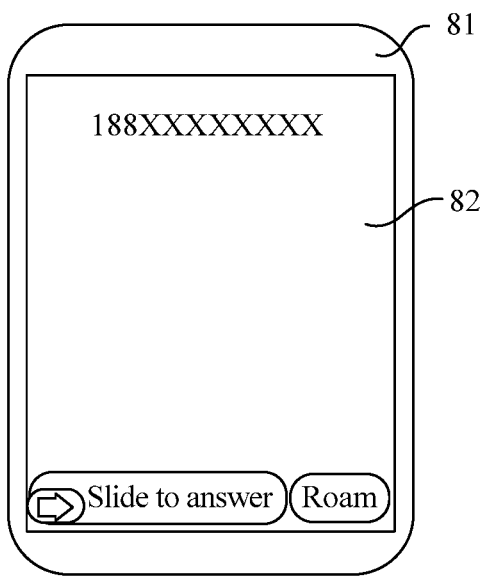
Figure 8F:
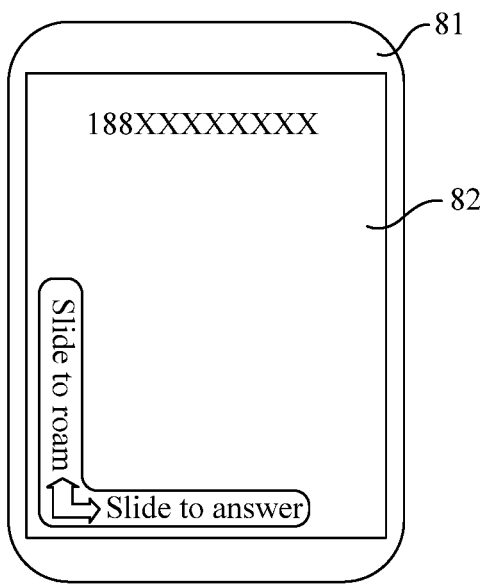
Figure 8G:
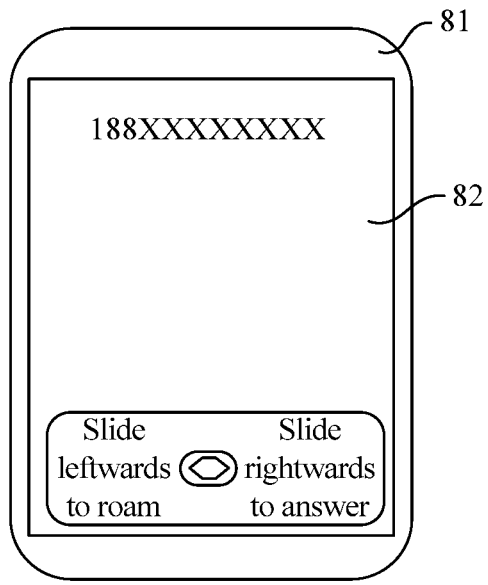
Figure 8H:
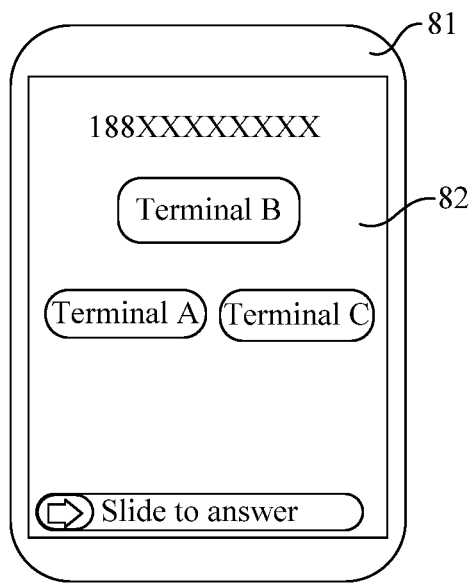
Figure 8I:
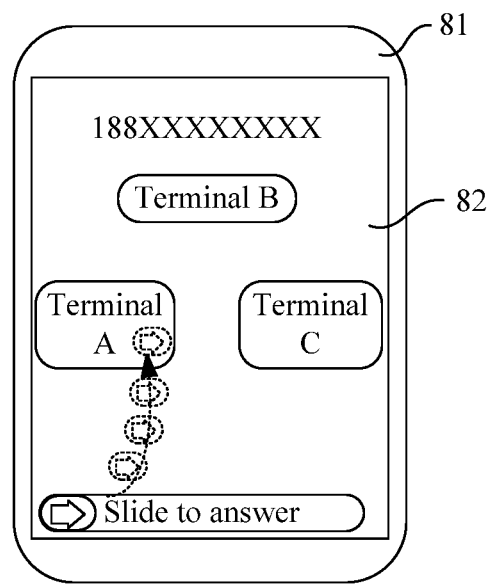

In the local terminal device in the embodiment of the present disclosure, as shown in FIG. 8E, if a call request is received in a screen locking state, a roam button may also be added to an original slide-to-answer interface. As shown in FIG. 8F and FIG. 8G, an additional direction of sliding-to-roam may also be added, and the user may roam the service by sliding towards this new direction. As shown in FIG. 8H and FIG. 8I, when there is a service request, in addition to the original sliding bar, terminals that support roaming, for example, the terminal A, the terminal B, and the terminal C, may also be displayed. The user may directly drag a sliding block to a corresponding terminal to finish roaming the service to the specified terminal.

Embodiment 9

Figure 9A:
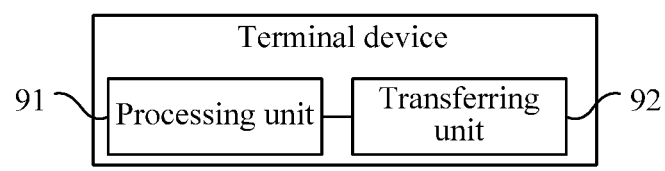
FIG. 9A and FIG. 9B are structural block diagrams of a terminal device according to Embodiment 9 of the present disclosure.
Figure 9B:
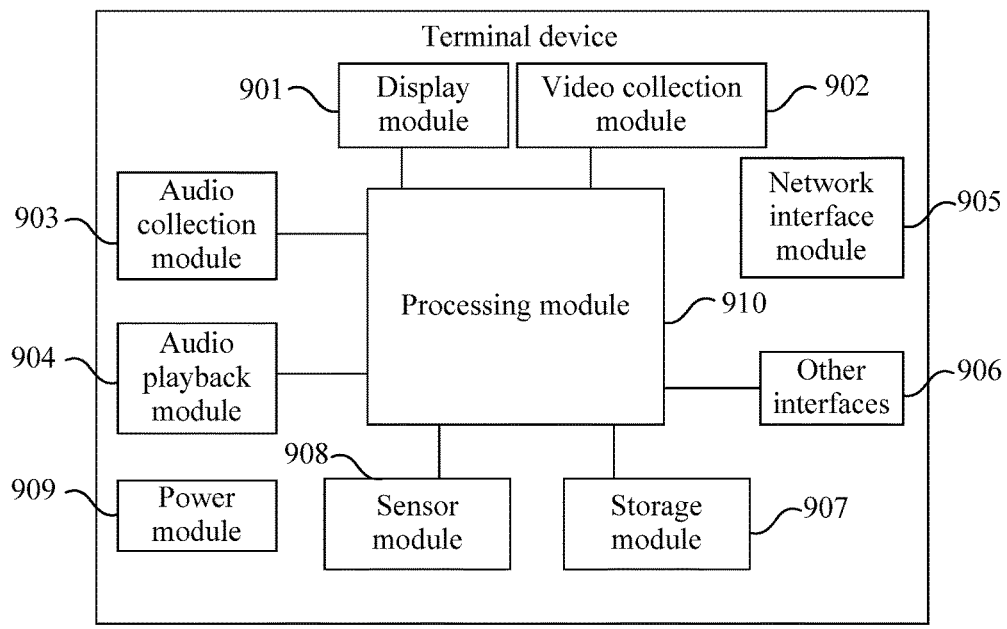

FIG. 9A and FIG. 9B are structural block diagrams of a terminal device according to Embodiment 9 of the present disclosure. As shown in FIG. 9A, the terminal device includes a processing unit 91 configured to determine whether a service needs to be roamed; and a transferring unit 92 configured to, in a case in which the service needs to be roamed, transfer, by the first local terminal, the service to a second local terminal, where the second local terminal is in communication with the terminal device by use of a first network.

The terminal device in this embodiment may execute any one service processing method in the foregoing embodiments. Each terminal device may be in communication with each other by use of the first local network, for example, a locally connected network connected by one or more of WiFi, Ethernet, Bluetooth® technology, NFC, and human body communication. The user may preferentially use different terminal devices in different environments. For example, a mobile phone is most commonly used on the road, and a tablet, a portable computer, or the like may be most commonly used at home. In the embodiment of the present disclosure, on a premise that the capability of the terminal device permits, the service provided by a service provider may be roamed among any terminal devices. Therefore, when using any terminal device, the user can also process a service request of other terminal devices. For example, in the evening, when the user is watching a video or surfing the Internet using a tablet at home, if a call is received on the mobile phone, the telephone service may be roamed to the tablet, and the user can directly answer the call on the tablet, without having to take off a headset and put aside the tablet before answering the call. Because the user can process a service request of another local terminal on a currently used terminal device, user experience is greatly improved. When the user receives, on one terminal device, the service request of another local terminal, a currently used service may be paused according to specific situations.

A structure of the terminal device may further include one or more of the following functional modules. As shown in FIG. 9B, a display module 901 of the terminal device may be configured for video display and related drive components, for example, a liquid crystal display (LCD) or organic light-emitting diode (OLED) screen and a drive module of the LCD or OLED screen. A video collection module 902 may be configured for related components that implement a video collection function, for example, a camera and a driver of the camera. An audio collection module 903 may include a microphone or a microphone array and related components. An audio playback module 904 may include a speaker or a speaker array and related drive components. A network interface module 905 may include various physical network interfaces supported by the terminal device. Other interfaces 906 may include interface modules, such as a subscriber identity module (SIM)-card interface, a storage-card interface, and a video interface, which are configured to be directly in communication with other local terminals. A storage module 907 may include various memories of the terminal device. A sensor module 908 may be various sensors, for example, a global positioning system (GPS), a gyroscope, an acceleration sensor, or a touch sensor, in the terminal device. A power module 909 may supply power support to the entire terminal device. A processing module 910 may include a software running platform and hardware modules of video, audio, application, control, and the like, where the processing unit 91 in the foregoing FIG. 9A may also be disposed in the processing module 910.

Figure 9C:
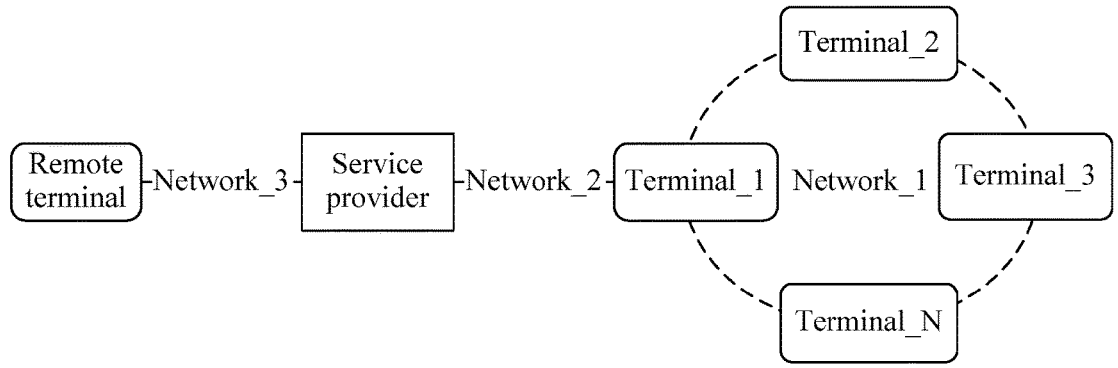
FIG. 9C is a schematic diagram of a networking structure of an application example of the terminal device according to Embodiment 9 of the present disclosure.

Further, the terminal device may be in communication with the service provider by use of a second network, for example, access networks such as a PSTN, a mobile network like CDMA, GSM, or WCDMA, and Ethernet. FIG. 9C is a schematic diagram of a networking structure of an application example of the terminal device according to Embodiment 9 of the present disclosure. As shown in FIG. 9C, a remote terminal is in communication with the service provider by use of a network_3, a terminal_1 is in communication with the service provider by use of a network_2, and the service provider is in communication with the remote terminal by use of the network_3. A network_1 formed by one or more interconnected terminals, such as the terminal_1 and terminal_2, is the first network, and the network_2, network_3, and service provider jointly form the second network, where the network_1 and the network_2 may be the same, or may be different, and the network_1 and the network_3 may be the same, or may be different. For example, two terminal devices, the terminal_1 and the remote terminal, are both in communication with the mobile operator by use of the GSM network; or the remote terminal is in communication with a fixed network operator by use of the PSTN, the terminal_1 is in communication with the mobile operator by use of the GSM network, and the two operators are in communication with each other by use of a gateway. In these cases, terminal devices in the structures of the embodiment of the present disclosure may all execute the solution of the service roaming method of the embodiment of the present disclosure. In addition, serving as a called party or a calling party of a call service, or serving as an initiator or a recipient of an information service, the terminal device in the embodiment of the present disclosure may execute the service roaming method of the embodiment of the present disclosure. Further, for the networking structure of the application example of the terminal device, reference may also be made to FIG. 2A and the related description.

In this embodiment, the local terminals may be interconnected in the first network. The first network is a locally interconnected network, roaming does not need to be controlled by an operator network, and the processing unit of the local terminal can control the roaming. Therefore, service roaming is convenient, no roaming fees need to be paid, and usage costs are low.

Embodiment 10

Figure 10:
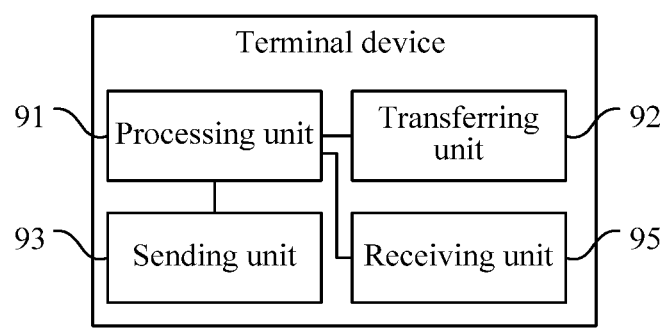
FIG. 10 is a structural block diagram of a terminal device according to Embodiment 10 of the present disclosure.

FIG. 10 is a structural block diagram of a terminal device according to Embodiment 10 of the present disclosure. Components with a same sign in FIG. 10 and FIG. 9 have a same meaning. As shown in FIG. 10, a main difference between this embodiment and the previous embodiment is that the terminal device may further include a sending unit 93 configured to send a roaming request to other local terminals including the second local terminal in the processing unit; and a receiving unit 95 configured to receive a roaming response from the second local terminal, where the other local terminals are in communication with the terminal device by use of the first network. The sending unit 93 and the receiving unit 95 may be disposed in the network interface module 905 in FIG. 9B.

In a possible implementation manner, the processing unit 91 is further configured to instruct the sending unit 93 to broadcast the roaming request to the other local terminals, and in a case in which the receiving unit 95 receives the roaming response, use a local terminal that returns the roaming response as the second local terminal.

In a possible implementation manner, the processing unit 91 is further configured to, after using the local terminal that returns the roaming response as the second local terminal, instruct the sending unit 93 to send a message of canceling the roaming request to a local terminal, except the second local terminal, in the other local terminals.

In a possible implementation manner, the processing unit 91 is further configured to instruct the sending unit 93 to send the roaming request to each local terminal of the other local terminals at a preset time interval in sequence, and in a case in which the receiving unit 95 receives the roaming response, use a local terminal that returns the roaming response as the second local terminal.

In a possible implementation manner, the processing unit 91 is further configured to, after sending the roaming request to the other local terminals, start timing when the sending unit 93 sends the roaming request; and if no roaming request is received within a set period of time, instruct the sending unit 93 to initiate a roaming request again or end the roaming.

In a possible implementation manner, the processing unit 91 is further configured to determine whether a trust relationship is established with the second local terminal; where the transferring unit 92 is further configured to transfer the service to the second local terminal when the processing unit 91 determines that the trust relationship is already established with the second local terminal.

In a possible implementation manner, with reference to scenario 1 to scenario 4 of case 1 in the foregoing embodiment of the service processing method and the related description, in a case in which the service is a service received by the receiving unit 95 from a remote terminal by use of a second network, the processing unit 91 is configured to execute any one or more of the following functions: determining whether the terminal device receives a roaming instruction from a user, where if the roaming instruction from the user is received, the service needs to be roamed; determining whether a device status of the terminal device meets a preset roaming condition, where if the preset roaming condition is met, the service needs to be roamed; determining whether the terminal device is being used by the user, where if the terminal device is not used by the user, the service needs to be roamed; and determining whether another local terminal that can process the service exists in the first network, where if another local terminal that can process the service exists, the service needs to be roamed.

In a possible implementation manner, the device status of the terminal device includes any one or more of the following states: the terminal device is processing a service of the same type; the terminal device is processing a service of another type; and the terminal device is in a sleep state.

Further, the processing unit 91 is further configured to, in the case in which the service is the service received by the receiving unit 95 from the remote terminal by use of the second network, instruct the sending unit 93 to forward data and/or an instruction, related to the service, from the remote terminal to the second local terminal by use of the first network, and instruct the sending unit 93 to forward a processing result of the service from the second local terminal to the remote terminal by use of the second network.

In a possible implementation manner, with reference to scenario 1 and scenario 2 of case 2 of the foregoing embodiment of the service processing method, in a case in which the service is a service initiated by the sending unit 93, the processing unit 91 is configured to execute any one or more of the following functions: determining whether the terminal device can process the service, where if the terminal device cannot process the service, the service needs to be roamed; and determining whether another local terminal that can process the service exists in the first network, where if another local terminal that can process the service exists, the service needs to be roamed.

Further, the processing unit 91 is further configured to, in the case in which the service is the service initiated by the terminal device, instruct the sending unit 93 to send a service request for the service to the second local terminal by use of the first network, such that the second local terminal sends the service request to a remote terminal by use of the second network, receives a processing result of the service from the remote terminal by use of the second network, and sends the processing result of the service to the first local terminal by use of the first network.

In this embodiment, the local terminals are interconnected in the first network, such that service roaming can be implemented. If the second network is included, the service roaming can be implemented simply by connecting one local terminal to the remote terminal by use of the second network. Because the first network is a locally interconnected network, roaming does not need to be controlled by an operator network, and the processing unit of the local terminal can control the roaming. Therefore, the service roaming is convenient, no roaming fees need to be paid, and usage costs are low.

Embodiment 11

Figure 11:
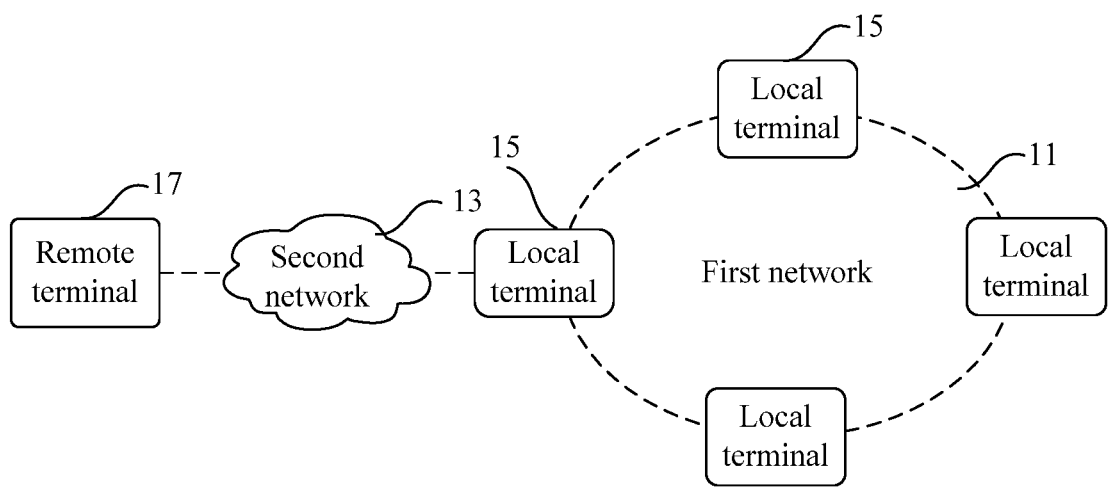
FIG. 11 is a structural block diagram of a service roaming network according to Embodiment 11 of the present disclosure.

FIG. 11 is a structural block diagram of a service roaming network according to Embodiment 11 of the present disclosure. As shown in FIG. 11, the service roaming network may include a first network 11.

The terminal device in any one structure of the foregoing embodiments may be used as at least one local terminal 15 in the first network 11. The local terminal may execute any one service processing method of the foregoing embodiments.

Further, the service roaming network may further include a second network 13, where at least one local terminal 15 in the first network 11 is in communication with the second network 13.

In this embodiment, the local terminals 15 are interconnected in the first network 11, such that service roaming can be implemented. If the second network 13 is included, the service roaming can be implemented simply by connecting one local terminal 15 to a remote terminal 17 by use of the second network 13. Because the first network 11 is a locally interconnected network, roaming does not need to be controlled by an operator network, and the local terminal 15 can control the roaming. Therefore, the service roaming is convenient, no roaming fees need to be paid, and usage costs are low.

A person of ordinary skill in the art may be aware that, exemplary units and algorithm steps in the embodiments described in this specification may be implemented by electronic hardware or a combination of computer software and electronic hardware. Whether the functions are implemented by hardware or software depends on particular applications and design constraint conditions of the technical solutions. A person skilled in the art may select different methods to implement the described functions for a particular application, but it should not be considered that the implementation goes beyond the scope of the present disclosure.

If the functions are implemented in a form of computer software and are sold or used as independent products, it can be considered to a certain extent that the entire or a part of (for example, the part contributing to the prior art) the technical solution of the present disclosure is implemented in a form of a computer software product. The computer software product is generally stored in a computer-readable storage medium and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A service processing method, comprising:
   receiving, by a first local terminal, a service from a remote terminal using a mobile network,
   determining, by the first local terminal, whether the service needs to be roamed by;
   determining whether another local terminal that processes the service exists in the WiFi network; and
   determining that the service needs to be roamed when the another local terminal that processes the service exists;
   sending, by the first local terminal, a roaming request to a second local terminal when the service needs to be roamed, wherein the second local terminal is in communication with the first local terminal via the WiFi network;
   receiving, by the first local terminal, a roaming response from the second local terminal;
   and transferring, by the first local terminal, the service to the second local terminal.

2. The service processing method of claim 1, wherein before transferring, by the first local terminal, the service to the second local terminal, the method further comprises:
   determining whether a trust relationship is established with the second local terminal; and
   transferring, by the first local terminal, the service to the second local terminal when the trust relationship is already established with the second local terminal.

3. The service processing method of claim 1, wherein a device status of the first local terminal comprises at least one of the following states:
   the first local terminal is processing a second service of a same type with the service that needs to be roamed;
   the first local terminal is processing a third service of another type with the service that needs to be roamed; or
   the first local terminal is in a sleep state.

4. The service processing method of claim 1, wherein transferring the service to the second local terminal comprises:
   forwarding, by the first local terminal, at least one of data or an instruction, related to the service, from the remote terminal to the second local terminal using the WiFi network; and
   forwarding, by the first local terminal, a processing result of the service from the second local terminal to the remote terminal using the mobile network.

5. The service processing method of claim 1, wherein the service is initiated by the first local terminal, and wherein transferring the service to the second local terminal comprises:
   sending, by the first local terminal, a service request for the service to the second local terminal using the WiFi network;
   sending, by the second local terminal, the service request to the remote terminal using the mobile network;
   receiving a processing result of the service from the remote terminal using the mobile network; and
   sending the processing result of the service to the first local terminal using the WiFi network.

6. A terminal device, comprising:
   a receiver configured to receive a service from a remote terminal using a mobile network;
   a processor coupled to the receiver and configured to:
   determine whether another local terminal that processes the service exists in a WiFi network: and
   determine that the service needs to be roamed when the another local terminal that processes the service exists;
   a transmitter coupled to the processor and configured to send a roaming request to a second local terminal when the service needs to be roamed, wherein the second local terminal is in communication with the terminal device using the WiFi network,
   wherein the receiver is further configured to receive a roaming response from the second local terminal, and
   wherein the processor is further configured to transfer the service to the second local terminal in response to the roaming response.

7. The terminal device of claim 6, wherein the processor is further configured to:
   determine whether a trust relationship is established with the second local terminal; and
   transfer the service to the second local terminal when the processor determines that the trust relationship is already established with the second local terminal.

8. The terminal device of claim 6, wherein a device status of the terminal device comprises at least one of the following states:
   the terminal device is processing a second service of a same type with the service that needs to be roamed;
   the terminal device is processing a third service of another type with the service that needs to be roamed; or
   the terminal device is in a sleep state.

9. The terminal device of claim 6, wherein the processor is further configured to:
   instruct the transmitter to forward at least one of data or an instruction, related to the service, from the remote terminal to the second local terminal using the WiFi network when the service is received by the receiver from the remote terminal using the mobile network; and
   instruct the transmitter to forward a processing result of the service from the second local terminal to the remote terminal using the mobile network.

10. The terminal device of claim 6, wherein the processor is further configured to:
    instruct the transmitter to send a service request for the service to the second local terminal using the WiFi network when the service is initiated by the terminal device;
    receive a processing result of the service from the remote terminal using the mobile network; and
    send the processing result of the service to the terminal device using the WiFi network.

11. A terminal device, comprising:
    a receiver configured to receive a service from a remote terminal using a mobile network;
    a processor coupled to the receiver and configured to:
    determine whether the terminal device is being used by a user; and
    determine that the service needs to be roamed when the terminal device is not being used by the user; and
    a transmitter coupled to the processor and configured to send a roaming request to a second local terminal when the service needs to be roamed, wherein the second local terminal is in communication with the terminal device using a WiFi network, wherein the receiver coupled to the processor and configured to receive a roaming response from the second local terminal, and wherein the processor is further configured to transfer the service to the second local terminal in response to the roaming response.

12. The terminal device of claim 11, wherein the processor is further configured to:
   determine whether a trust relationship is established with the second local terminal; and
   transfer the service to the second local terminal when the processor determines that the trust relationship is already established with the second local terminal.

13. The terminal device of claim 11, wherein a device status of the terminal device comprises at least one of the following states:
   the terminal device is processing a second service of a same type with the service that needs to be roamed;
   the terminal device is processing a third service of another type with the service that needs to be roamed; or
   the terminal device is in a sleep state.

14. The terminal device of claim 11, wherein the processor is further configured to:
   instruct the transmitter to forward at least one of data or an instruction, related to the service, from the remote terminal to the second local terminal using the WiFi network when the service is received by the receiver from the remote terminal using the mobile network; and
   instruct the transmitter to forward a processing result of the service from the second local terminal to the remote terminal using the mobile network.

15. The terminal device of claim 11, wherein the processor is further configured to:
   instruct the transmitter to send a service request for the service to the second local terminal using the WiFi network when the service is initiated by the terminal device;
   receive a processing result of the service from the remote terminal using the mobile network; and
   send the processing result of the service to the terminal device using the WiFi network.

* * * * *